United States Patent

[11] 3,571,834

[72] Inventor  Richard A. Mathias
             Cincinnati, Ohio
[21] Appl. No. 721,508
[22] Filed    Apr. 15, 1968
[45] Patented Mar. 23, 1971
[73] Assignee Cincinnati Milacron Inc.
             Cincinnati, Ohio

[54] MACHINE TOOL ADAPTIVE CONTROL
29 Claims, 10 Drawing Figs.

[52] U.S. Cl. ................................................... 10/139,
                                                         77/32.7
[51] Int. Cl. ................................................. B23g 1/00,
      B23g 11/00, B23b 39/10, B23b 47/18, B23b 47/24
[50] Field of Search .......................................... 10/135,
      136, 136.5, 139; 77/32.4, 32.7, 32.8, 32.9; 90/21

[56]              References Cited
                UNITED STATES PATENTS
Re24,491  6/1958  Cross et al. .................. 77/32.7
1,403,170 1/1922  Kind ........................... 10/136.5
2,830,310 4/1958  Smith .......................... 10/136.5
3,220,315 11/1965 Mathias ........................ 77/32.7
3,259,023 7/1966  Rieger et al. .................. 77/32.7
3,311,025 3/1967  Zankl et al. ................... 90/21
3,325,710 6/1967  Reynolds ....................... 77/32.7
3,446,099 5/1969  Lesher et al. .................. 77/32.7
3,461,472 8/1969  Sedgwick et al. ................ 77/32.7

*Primary Examiner*—Charles W. Lanham
*Assistant Examiner*—E. M. Combs
*Attorney*—Frank C. Leach, Jr.

ABSTRACT: A mechanism controls both the speed of rotation of a cutting tool for performing machine tool operations on a workpiece and the relative feedrate between the cutting tool and the workpiece. The control mechanism includes means to indicate when the life of the cutting tool has ended. The control mechanism has means to provide a minimum relative feedrate between the workpiece and the cutting tool. The mechanism also includes means to permit a relatively rapid movement between the cutting tool and the workpiece when the cutting tool is not engaging the workpiece.

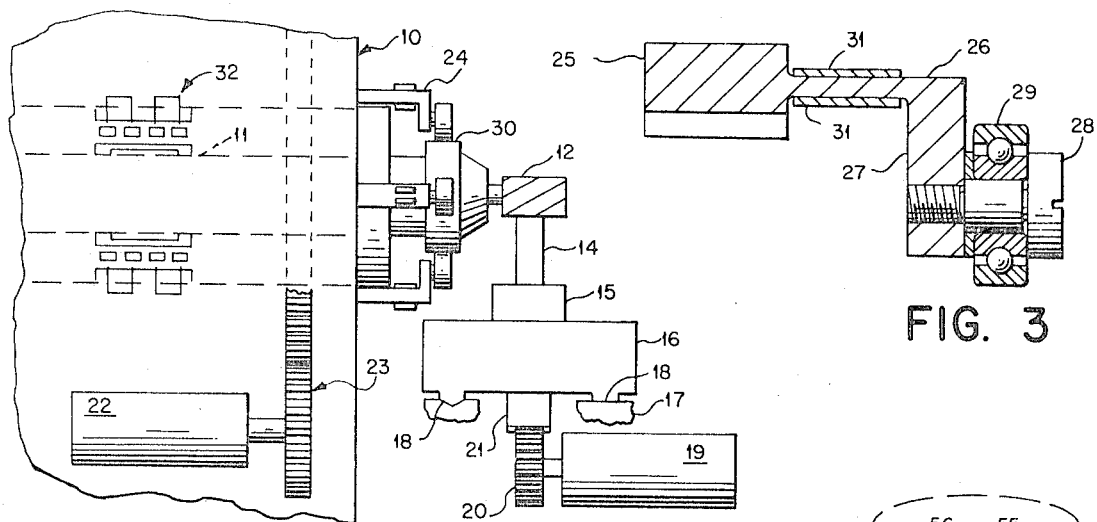
FIG. 1
FIG. 3
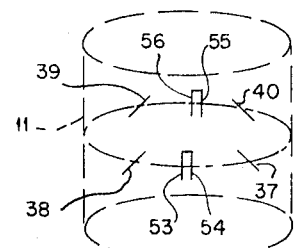
FIG. 4
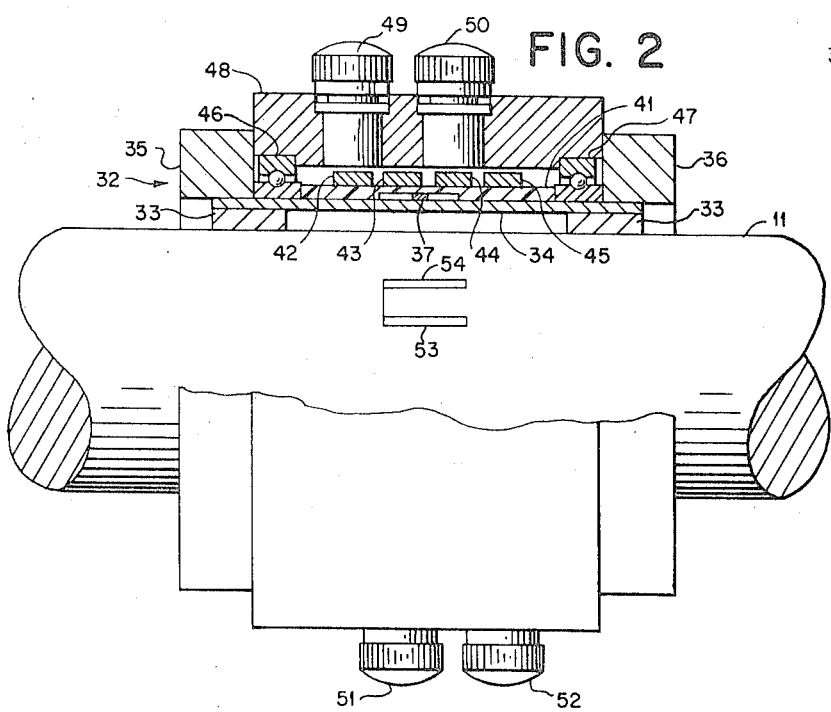
FIG. 2
FIG. 5
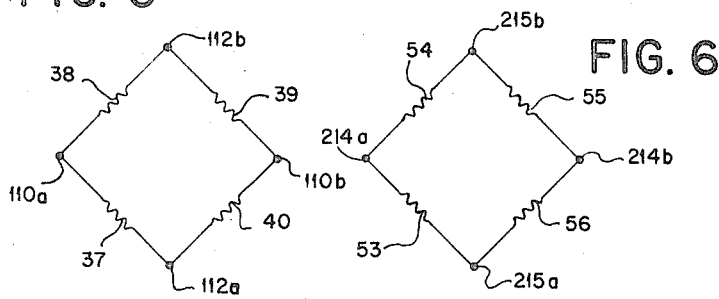
FIG. 6
INVENTOR.
RICHARD A. MATHIAS
BY Frank C. Leach Jr.
ATTORNEY

MACHINE TOOL ADAPTIVE CONTROL

In U.S. Pat. No. 3,220,315, issued to me, there is shown a mechanism for controlling the operations of a machine tool. The present invention is an improvement over my prior patent.

In my prior patent, the feedback signal from the cutting conditions is the ratio of the resultant deflection of the cutting tool to the tangential cutting force. This feedback signal is utilized to provide an output signal that is a linear approximation of the desired logarithmic relation to the feedback signal.

While the output of the control mechanism of my prior patent is satisfactory, the present invention produces a more refined control and, therefore, more efficient utilization of the cutting tool. In the present invention, the feedback signal is the ratio of the product of the square of the deflection of the cutting tool and the ratio of the stiffness between the cutting tool and the workpiece to the tangential cutting force.

The output signal, which is produced in accordance with the feedback signal and is inverse thereto, is logarithmically related to the feedback signal rather than being a linear approximation thereof. Thus, the present invention controls the rate of rotation of the cutting tool and the relative movement between the cutting tool and the workpiece in accordance with the particular operation of the cutting tool. Accordingly, various logarithmic relations exist between the feedback signal and the output signal, which controls the cutting tool and the relative movement between the cutting tool and the workpiece. Therefore, the present invention provides a more refined control with the signal being directly related to the logarithmic relation between tool life and cutting speed.

In my prior patent, the control included means to move the cutting tool and the workpiece relative to each other at a rather rapid rate when the cutting tool was not engaging the workpiece. This rapid movement was stopped whenever a deflection of the cutting tool existed.

In the present invention, the rapid rate of movement is stopped whenever there exists deflection of the cutting tool or an axial thrust force or a tangential cutting force. Thus, a more sensitive control for stopping rapid relative movement between the cutting tool and the workpiece when the cutting tool engages the workpiece is provided by the present invention.

In my prior patent, the tolerance was controlled by the resultant deflection component of the cutting tool. Furthermore, this control was utilized for both roughing and finishing cuts.

In the present invention, the resultant deflection is still employed during roughing. However, in a finishing cut, the present invention utilizes only the deflection of the cutting tool normal to the surface to be finished. Thus, a closer finish of the surface is obtained with the present invention.

In my prior patent, the relative feedrate between the workpiece and the cutting tool was set at a maximum that could decline to zero whereby stopping of relative movement between the workpiece and the cutting tool would occur. In the present invention, a minimum feedrate also may be established in addition to a maximum feedrate. Thus, the present invention permits feedrate boundaries to be set for all operations except tapping.

The output signal, which controls the speed of rotation of the cutting tool and the relative movement between the tool and the workpiece, was furnished as r.p.m. of the cutting tool in my prior patent. In the present invention, the output signal is supplied as the feet per minute of the cutting tool.

Since the cutting speed in feet per minute is independent of the diameter of the cutting tool, the operator of a machine utilizing the control of the present invention does not have to translate the various cutting speeds in feet per minute into r.p.m. by calculating them in accordance with the diameter of the cutting tool. It is only necessary for the operator of a machine utilizing the control mechanism of the present invention to provide the various cutting speeds in feet per minute as inputs directly from a handbook, for example, rather than having to calculate an r.p.m. of the cutting tool depending on its diameter and its cutting speed in feet per minute.

An object of this invention is to provide a control mechanism for a machine tool in which the control is responsive to various cutting conditions.

Another object of this invention is to provide a control mechanism that regulates the cutting speed of a cutting tool and the relative feedrate between the tool and the workpiece.

A further object of this invention is to provide a mechanism that automatically indicates when the life of a cutting tool has ended.

Other objects of this invention will be readily perceived from the following description, claims, and drawings.

This invention relates to a machine tool having a workpiece supported thereon and a cutting tool extending therein toward the workpiece. The cutting tool and the workpiece are moved relative to each other by means, which is controlled by a mechanism including first means to produce a first signal in accordance with the cutting force between the cutting tool and the workpiece and second means to produce a second signal in accordance with the axial thrust on the cutting tool. Means, which regulates the feedrate of the relative moving means, includes first means to produce a signal in accordance with the cutting conditions to regulate the feedrate of the relative moving means and second means responsive to the absence of a signal from both the first and second signal producing means to increase the feedrate to a predetermined feedrate of the relative moving means irrespective of the signal from the first means of the regulating means.

This invention also relates to a machine tool having a workpiece supported thereon and a rotatable cutting tool therein extending toward the workpiece. Means rotates the cutting tool and means moves the cutting tool and the workpiece relative to each other. The rates of operation of the rotating means and the movable means are controlled by a mechanism, which comprises first means to produce a first signal proportional to the cutting force between the cutting tool and the workpiece, second means to produce a second signal proportional to the resultant deflection of the cutting tool, and third means to produce a third signal proportional to the axial thrust of the cutting tool. An input from at least one of the first, second, and third means is received by suitable means, which produces an output logarithmically regulated to its input. The speed of the rotating means is regulated by fourth means in accordance with the output of the receiving means and the relative moving means is regulated in response to the output of the receiving means by fifth means.

This invention further relates to a machine tool having a workpiece supported thereon and a cutting tool therein extending toward the workpiece. The cutting tool and the workpiece are moved relative to each other by means. A device, which determines the end of the life of the cutting tool, comprises first means to produce a first signal in accordance with the cutting force between the cutting tool and the workpiece and second means to produce a second signal in accordance with either the axial thrust of the cutting tool or the resultant deflection of the cutting tool depending on the use of the cutting tool. When the first and second signals are equal, suitable means produces a signal to indicate the end of the life of the cutting tool.

This invention also further relates to a machine tool having a workpiece supported thereon and a cutting tool therein extending toward the workpiece. The cutting tool and the workpiece are moved relative to each other by suitable means. The relative moving means is controlled by a mechanism comprising means to produce a first signal in accordance with the cutting conditions to regulate the feedrate of the relative moving means and means to produce a second signal to maintain the feedrate of the relative moving means at a predetermined minimum. The mechanism has means to render the second signal effective to control the feedrate of the relative moving means when the first signal produces a feedrate below the predetermined minimum.

This invention still further relates to a machine tool having a workpiece supported thereon and a rotatable tap therein extending toward the workpiece. Means rotates the tap. Means moves the tap and the workpiece relative to each other with a mechanism controlling the relative moving means. The mechanism comprises means to regulate the speed of the rotating means in accordance with the cutting conditions and means to regulate the feedrate of the relative moving means in accordance with the speed of the rotating means. The mechanism also has means to simultaneously reverse the direction of rotation of the rotating means and the feed of the relative moving means when a predetermined cutting condition occurs.

The attached drawings illustrate a preferred embodiment of the invention, in which:

FIG. 1 is a schematic view of a tool machine utilizing the control mechanism of the present invention;

FIG. 2 is a sectional view, partly in elevation, of a sensing spindle torque transducer and means for sensing axial thrust on the spindle;

FIG. 3 is a sectional view of a transducer for sensing deflection of the spindle;

FIG. 4 is a schematic perspective view illustrating the arrangement of various strain gauges on the spindle of the cutting tool;

FIG. 5 is a schematic wiring diagram of the bridge circuit for sensing the torque on the spindle;

FIG. 6 is a schematic wiring diagram of the bridge circuit for sensing the axial thrust on the spindle;

Figure 7A:
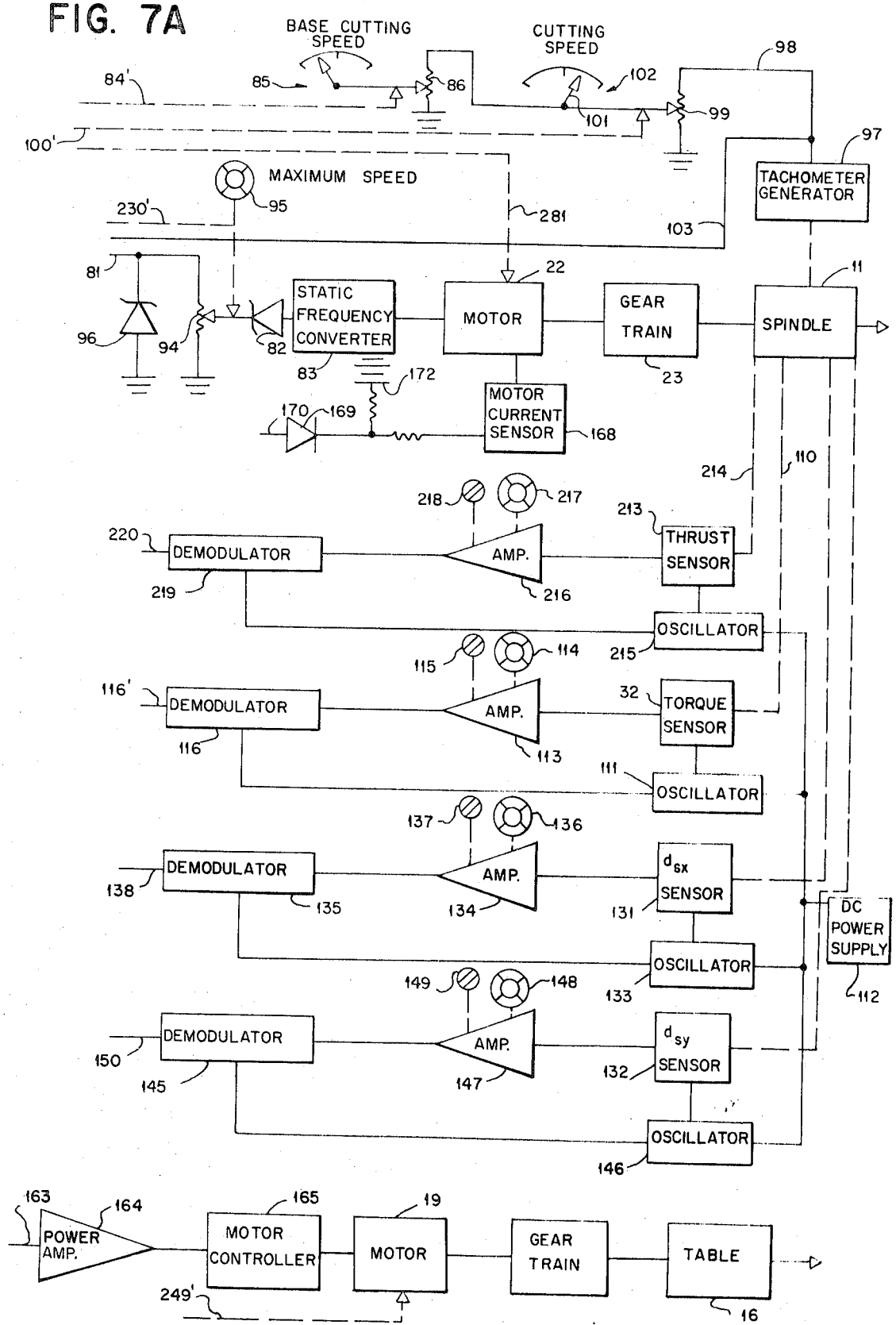
Figure 7B:
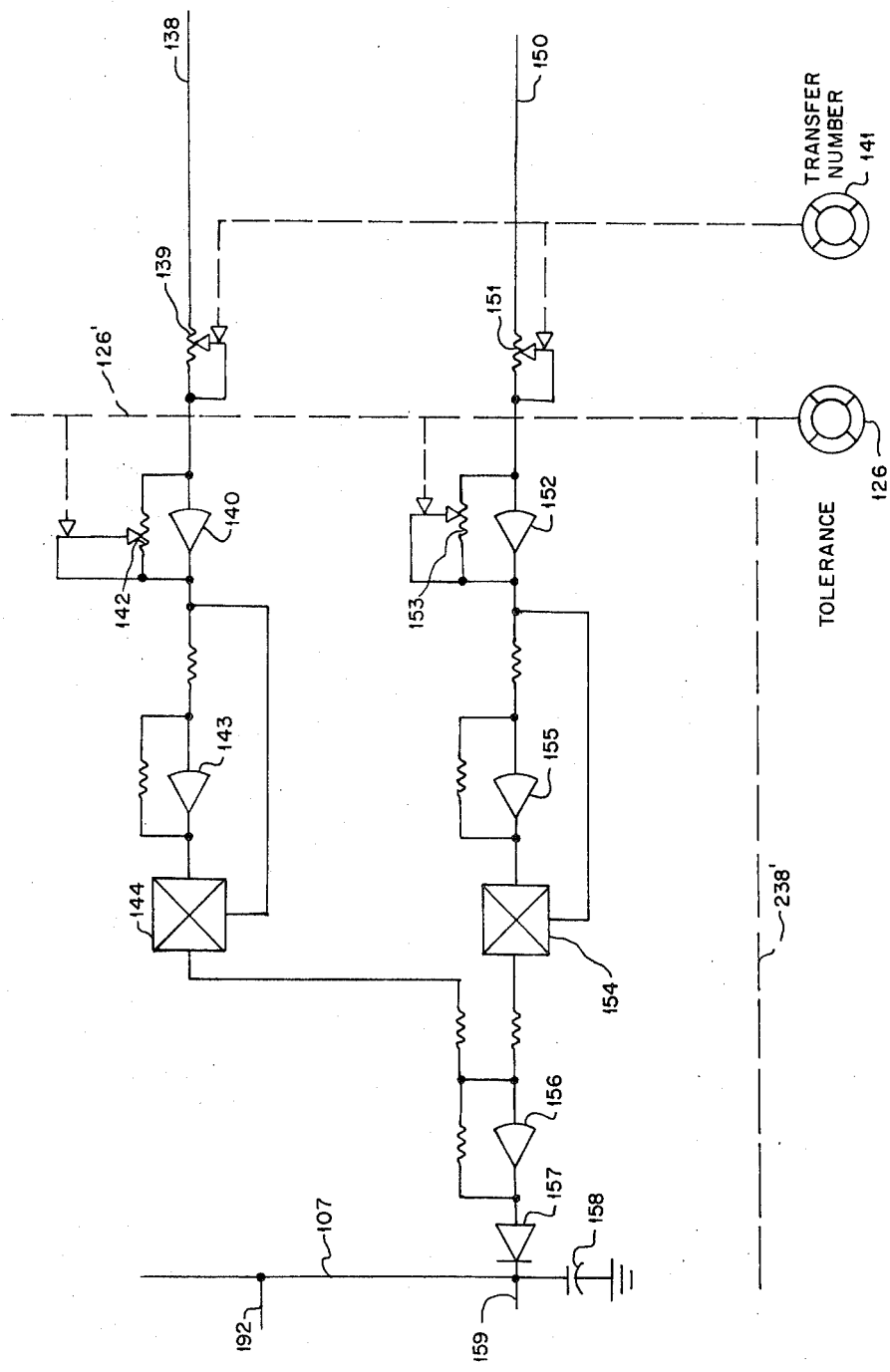
Figure 7C:
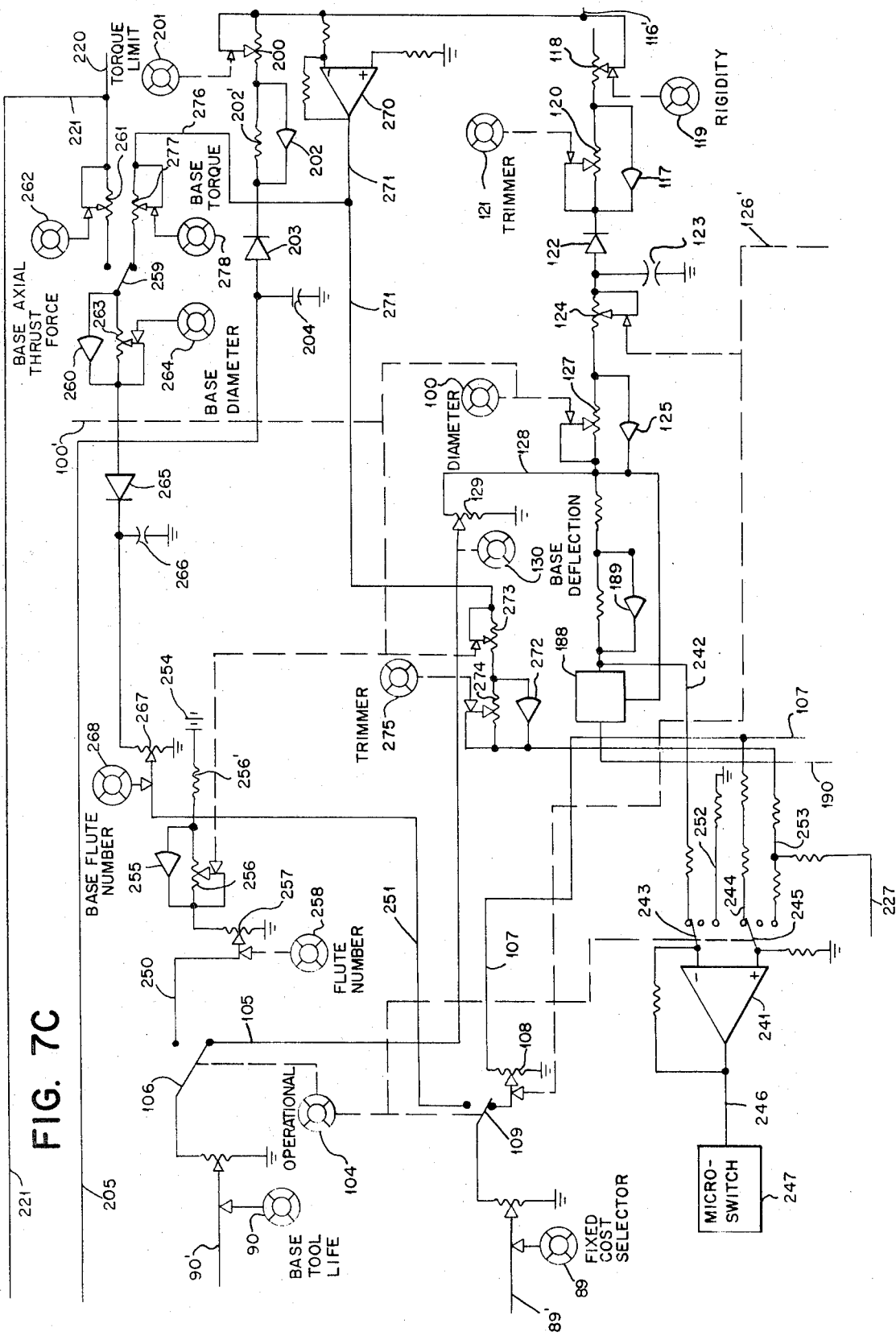
Figure 7D:
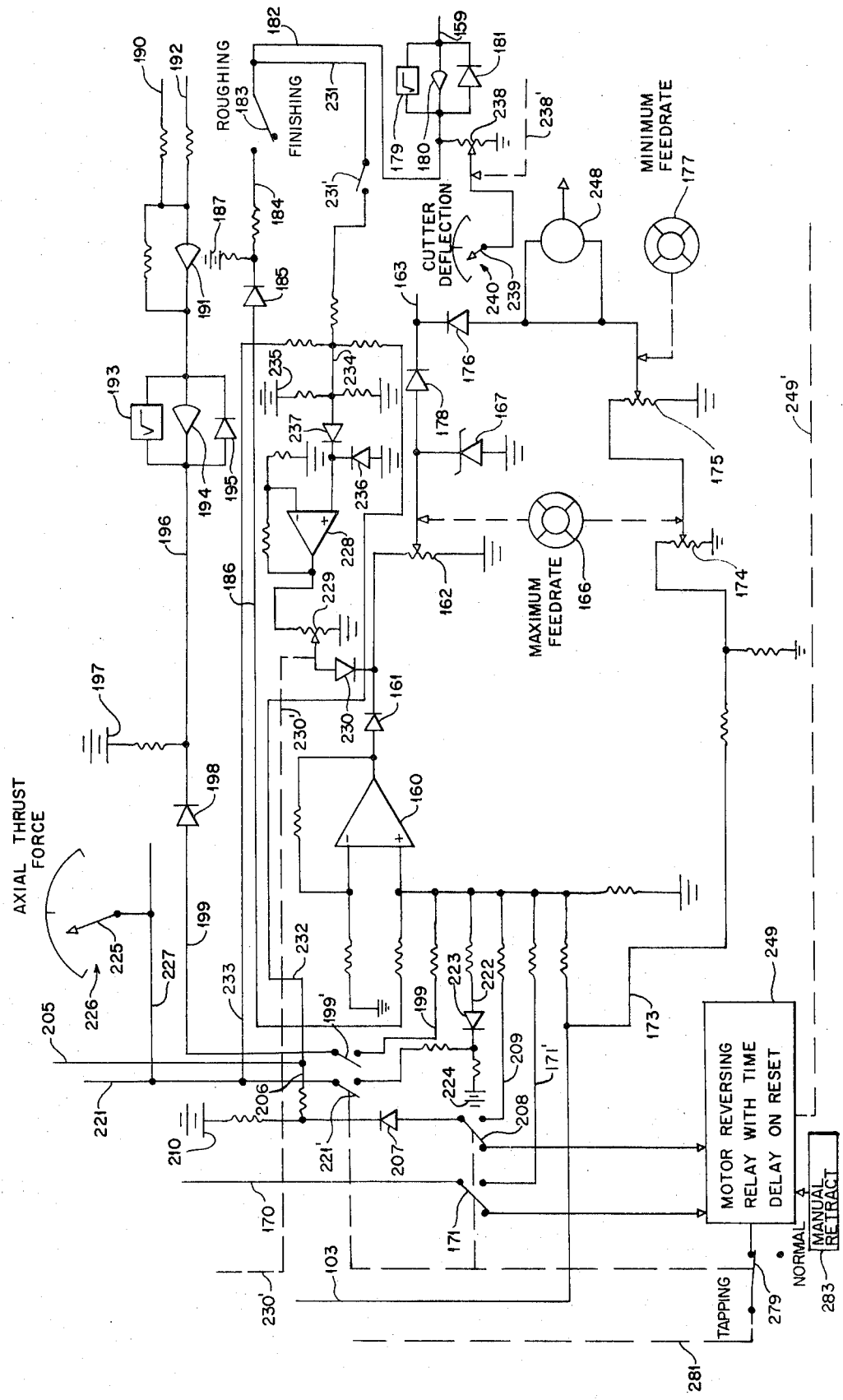
Figure 7E:
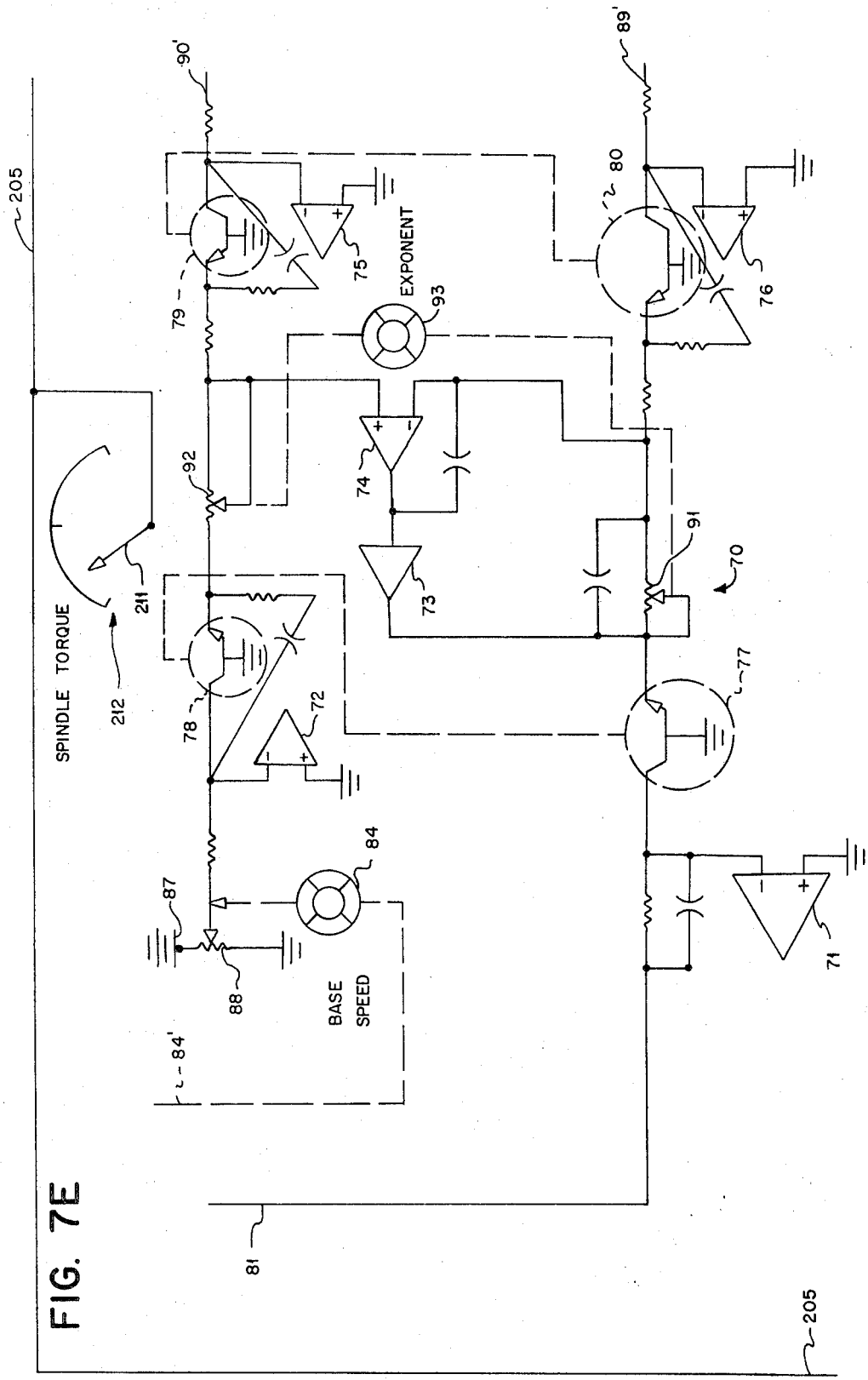
Figure 8:
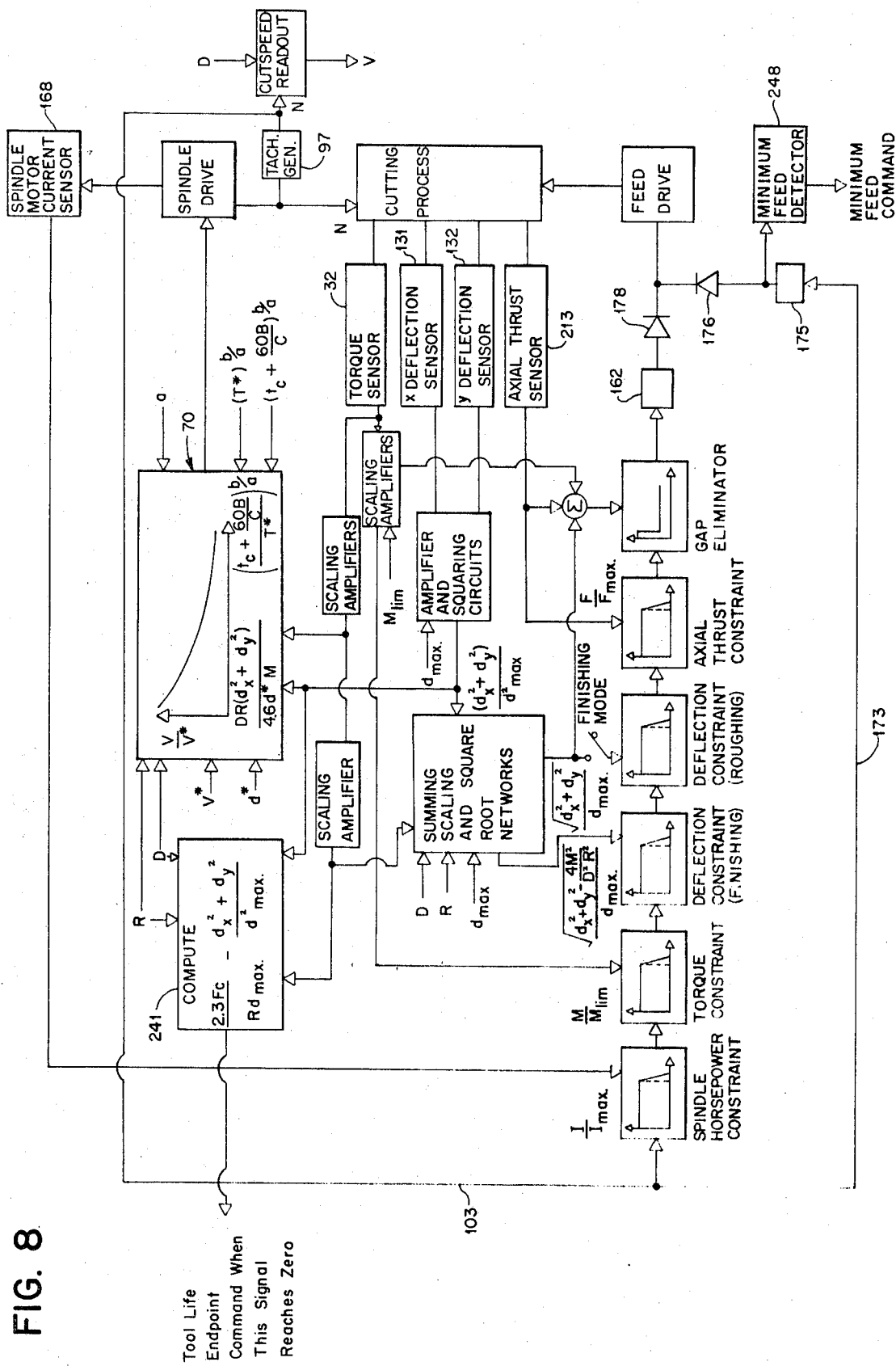
Figure 9:
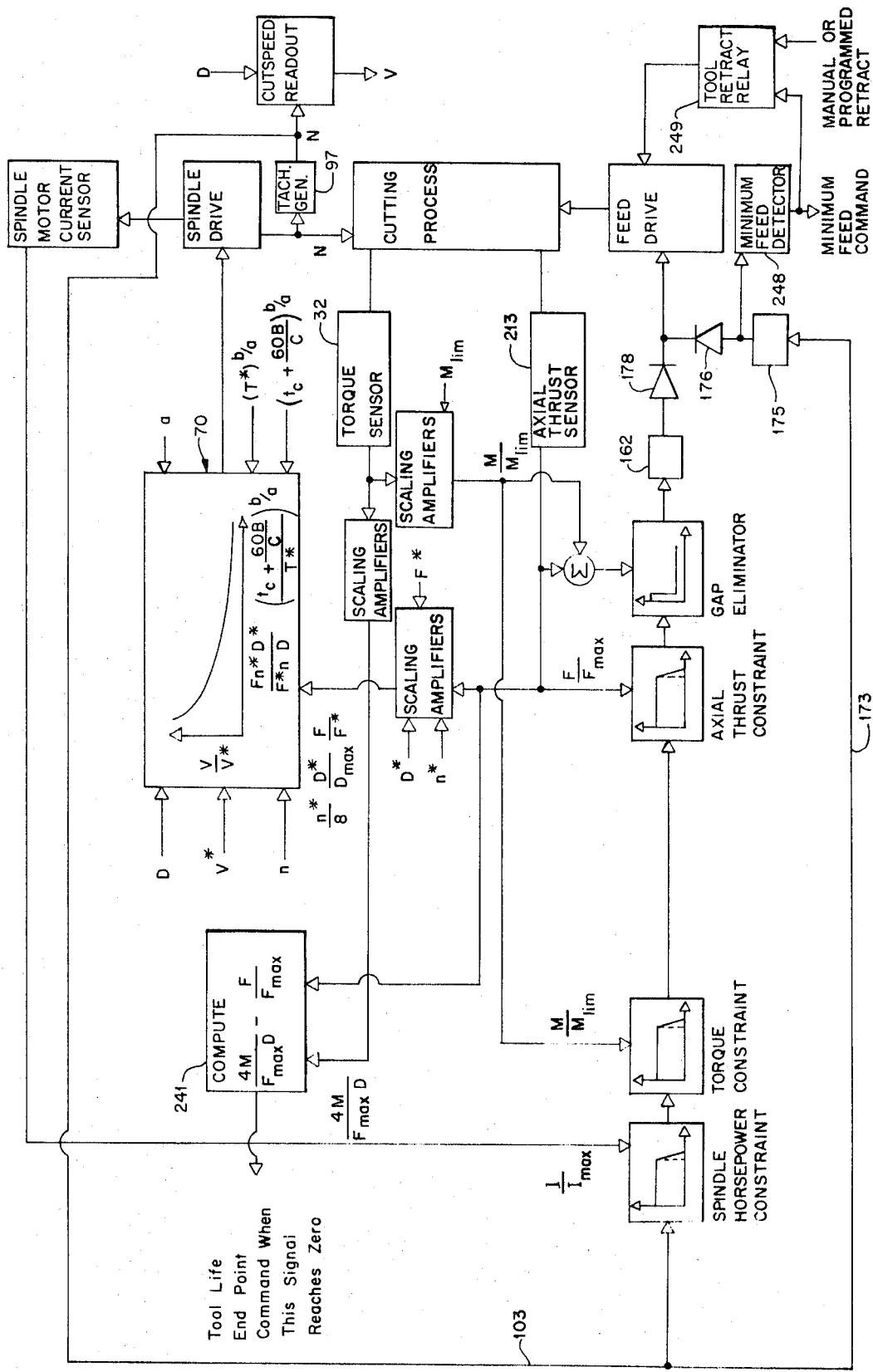
Figure 10:
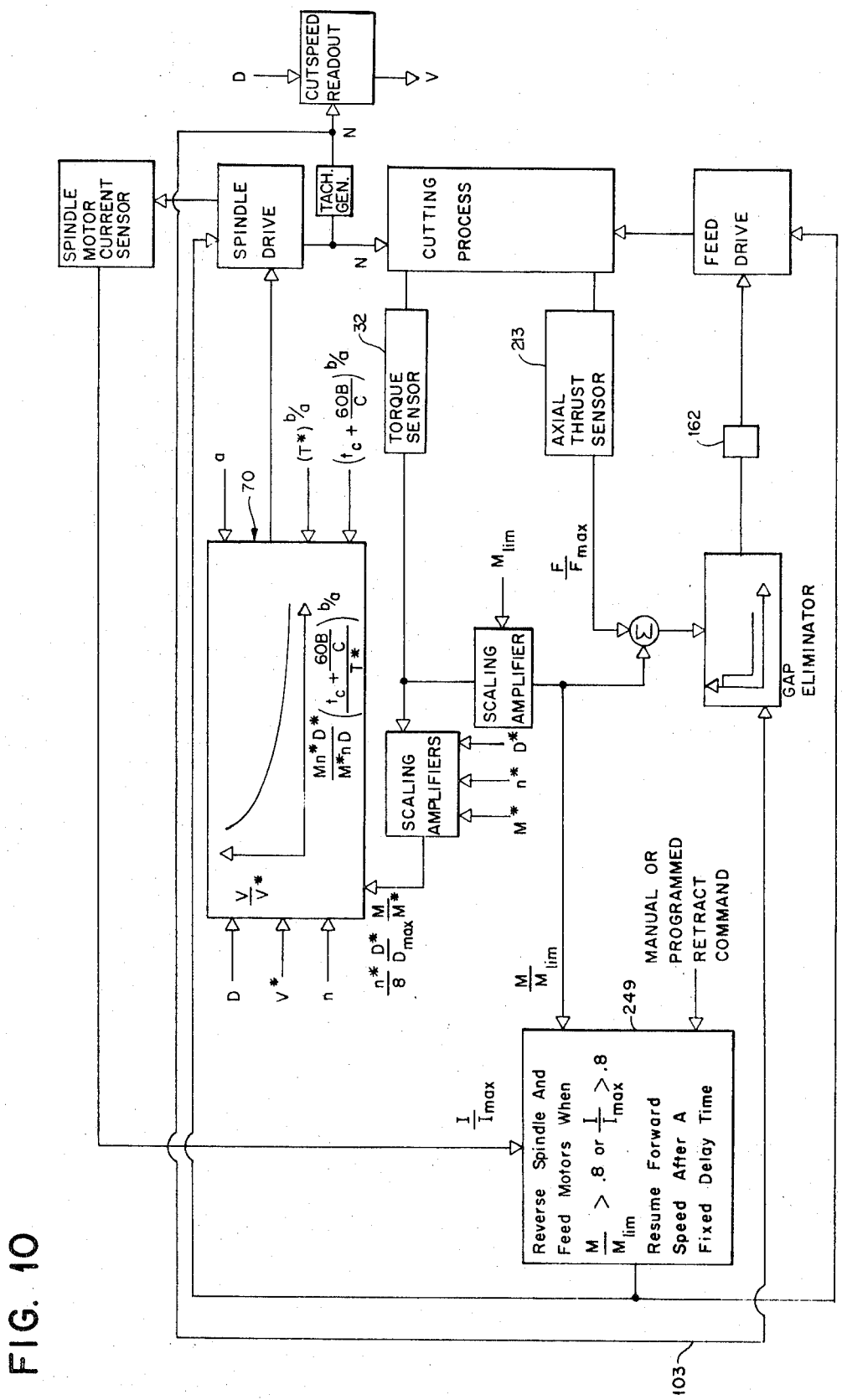
Figure 11:
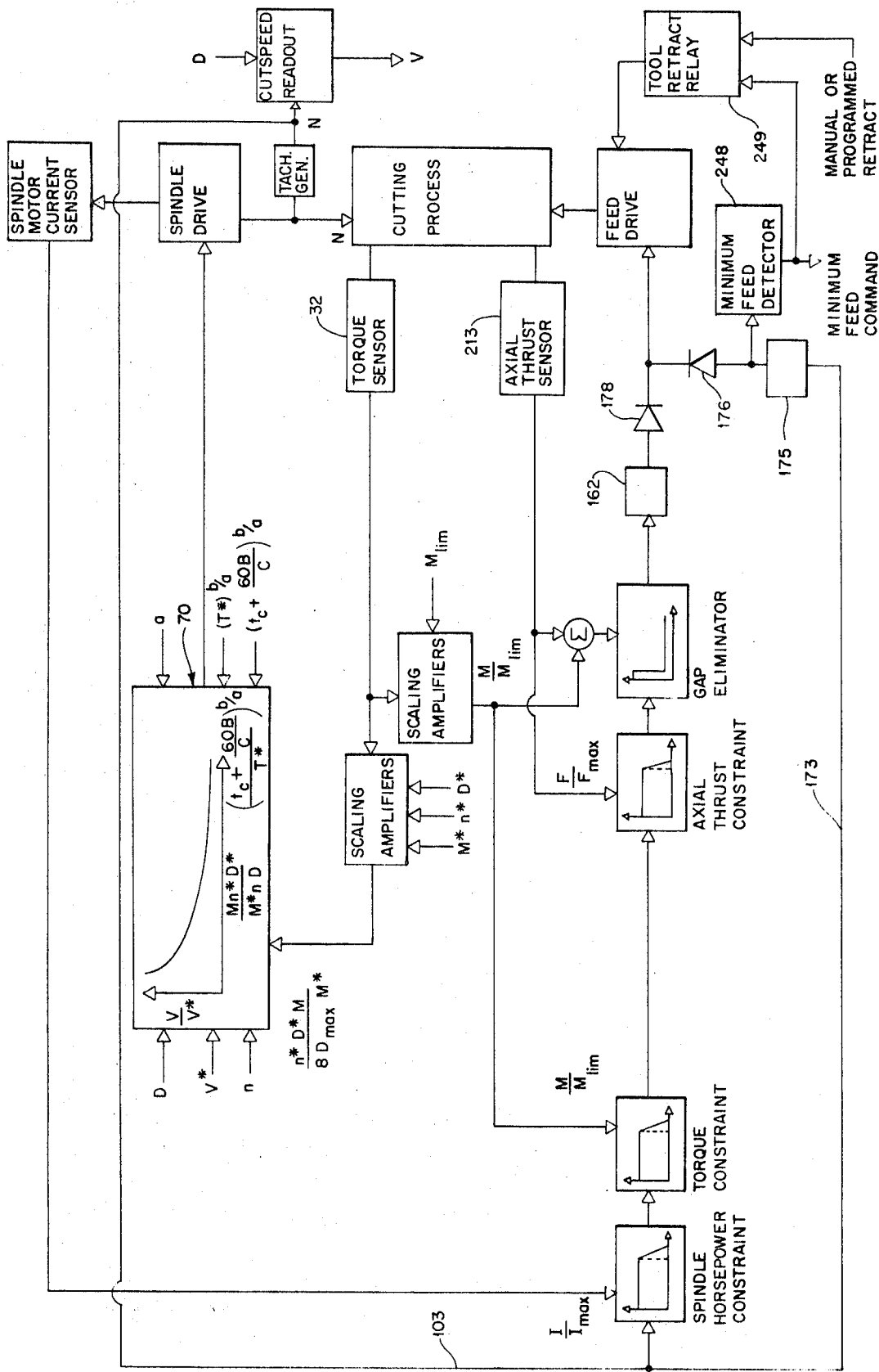

FIGS. 7A—7E are a schematic wiring diagram of the control mechanism of the present invention;

FIG. 8 is a schematic block diagram of the portions of the wiring diagram of FIGS. 7A—7E utilized when the cutting tool is employed in a milling or boring operation;

FIG. 9 is a schematic block diagram of the portions of the wiring diagram of FIGS. 7A—7E utilized when the cutting tool is employed in a drilling, spot facing, or counterboring operation;

FIG. 10 is a schematic block diagram of the portions of the wiring diagram of FIGS. 7A—7E utilized when the cutting tool is employed in a tapping operation; and FIG. 11 is a schematic block diagram of the portions of the wiring diagram of FIGS. 7A—7E utilized when the cutting tool is employed in a reaming operation.

Referring to the drawings and particularly FIG. 1, there is shown a milling machine with which the control mechanism of the present invention may be utilized. The milling machine may be a simplified form representative of a standard type of knee and column milling machine and altered as will be apparent from the following description.

The milling machine includes a machine column 10, which houses a rotatable spindle 11. The spindle 11 has its forward end projecting outwardly from the column 10 and conventionally formed to receive and hold, through a holder, a cutting tool 12 such as a milling cutter. When the cutting tool 12 is rotated with the spindle 11 and brought into contact with a workpiece 14, the cutting tool 12 will remove material from the workpiece 14 in a milling operation.

In the example shown, the spindle 11 is rotatable at a fixed location, and the workpiece 14 is moved into contact with the cutting tool 12 to provide the feed movement. Of course, it should be understood that the workpiece 14 could be at a fixed location and the cutting tool 12 moved into contact with the workpiece 14.

The workpiece 14 is held in a fixture 15, which is fixedly attached on a machine table 16. The table 16 is slidably supported on a saddle 17, which has longitudinal ways 18 along which the table 16 is movable by energization of a motor 19.

The motor 19 is preferably a hydraulic motor having a constant torque output but a variable rate of operation. However, the motor 19 may be any other suitable type of motive means.

The motor 19 is connected to the table 16 to move the table 16 through a gear train. The gear train includes a gear 20 on the shaft of the motor 19 and a rack 21 on the lower side of the table 16. It should be understood that any other suitable type of mechanical connection between the motor 19 and the table 16 may be employed.

The spindle 11 is rotated by a constant torque and variable speed motor 22. The spindle motor 22 is preferably an AC motor. The motor 22 is connected through a gear train 23 to the spindle 11 to provide a predetermined drive ratio between the motor 22 and the spindle 11. While the gear train 23 is shown in FIG. 1 as a pair of gears with one attached to the shaft of the motor 22 and the other fixed to the spindle 11 for clarity purposes, it should be understood that the gear train 23 includes a transmission whereby various predetermined drive ratios between the spindle motor 22 and the spindle 11 may be selected by the operator of the machine.

Four sensors 24, which are transducer elements, are disposed around the forward end of the spindle 11 and spaced 90° from each other. One pair of the diametrically disposed sensors 24 provides a signal indicative of the deflection of the spindle 11 in one of two coordinate axes while the other pair of the sensors 24 furnishes a signal indicative of the deflection in the other of the two coordinate axes. Thus, with the sensors 24 providing signals indicative of the deflection of the end of the spindle 11 in two coordinate directions, the resultant deflection of the spindle 11 may be ascertained. The deflection of the spindle 11, which has the cutting tool 12 secured thereto through the holder, is proportional to the deflection of the cutting tool 12.

Each of the sensors 24 is identical to the other. As shown in FIG. 3, one of the sensors 24 includes a mounting block 25, which is adapted to be fixedly attached to the column 10 adjacent the spindle 11.

A cantilever arm 26 extends outwardly from the block 25 and has a mounting bracket portion 27 disposed at substantially right angles thereto at the end remote from the mounting block 26. The bracket portion 27 has an axial screw 28 fixedly connected thereto. The screw 28 supports a preloaded antifriction roller 29 thereon. The outer roll of the roller 29 is adapted to engage and roll on an annular collar 30 (see FIG. 1), which is fixed to the spindle 11 and ground in place thereon so as to be exactly concentric therewith.

The cantilever arm 26 has a strain gauge 31 attached integrally therewith on each side thereof. The strain gauges 31 can be of any well-known type that produces an electrical signal variation as a result of a minute change in the dimension of the surface on which they are mounted.

By having the sensors 24 on diametrically disposed sides of the spindle 11 and the strain gauges 31 attached on opposite sides of each of the sensors 24, a system is provided in which signals due to thermal growth of the sensors 24, the spindle 11, and the collar 30 cancel themselves out. Accordingly, when the strain gauges 31 of the sensors 24 are connected in the conventional bridge circuit, the resulting signal depends solely upon the deflection of the spindle 11 produced by the cutting operation; as previously mentioned, this deflection is directly proportional to the deflection of the cutting tool 12.

It should be understood that other suitable types of sensors could be employed to produce signals indicative of the deflection of the spindle 11 or the cutting tool 12. Suitable examples of such sensors are capacitance probes, pneumatic gap measuring devices, and linearly variable differential transformer probes.

The present invention also includes means to produce a signal proportional to the torque strain of the spindle 11 during a cutting operation. Since the torque strain of the spindle 11 results from the wind up of the spindle 11 caused by opposition to rotation of the spindle 11 by the motor 22 due to the tangential cutting force on the cutting tool 12, the signal from the torque measuring means is directly proportional to and can be used as representative of the tangential cutting force with the proper scaling of the signal for the diameter of the cutting tool 12 since the diameter is inherent in the signal at this point.

Referring to FIG. 2, there is shown a transducer 32 for producing a signal proportional to the torque strain of the spindle 11 during cutting. The transducer includes a pair of spacer rings 33, which are fixed on the spindle 11 at spaced axial locations thereon. A torque tube 34 is received between the rings 33 and is held in place by a pair of clamp rings 35 and 36.

The torque tube 34 has a set of four strain gauges 37—40 attached thereto with the strain gauges 37—40 being spaced 90 apart around the spindle 11. As shown in FIG. 4, each of the strain gauges 37—40 is positioned at an angle of 45° to a plane containing the longitudinal axis of the spindle 11. The circuit arrangement of the strain gauges 37—40 is shown in FIG. 5. When the gauges 37 and 39 are lengthened, the gauges 38 and 40 are shortened whereby the output of the Wheatstone bridge is proportional to the torque on the spindle 11.

An insulating layer 41, which is applied over the torque tube 34 and the strain gauges 37—40, has a set of four commutator rings 42—45 received over the insulating layer 41. Each of the commutator rings 42—45 is connected to one of the four corner points of the Wheatstone bridge circuit of FIG. 5.

A pair off bearings 46 and 47 is received over the torque tube 34 adjacent each end thereof. The bearings 46 and 47 are disposed between the ends of the insulating layer 41 and the clamp rings 35 and 36. A brush housing 48 is received over the bearings 46 and 47 and is adapted for fixed location in the column 10 as schematically shown in FIG. 1. The spindle 11 and the torque tube 34 are rotatable in unison relative to the housing 48.

The brush housing 48 has brush holders 49—52 held therein. Each of the brush holders 49—52 has a commutator brush therein in sliding electrical contact with one of the rings 42—45. Thus, the brushes cooperate with the rings 42—45 to provide electrical signals from the strain gauges 37—40 for transmission to the control circuit of FIGS. 7A—7E.

It should be understood that other equivalent means for producing the signal, which is representative of the torque strain in the spindle 11, could be employed instead of the foregoing means. For example, a pair of synchro resolvers or a photoelectrical-rotating disc apparatus could be utilized.

The machine also includes means to measure the axial thrust on the spindle 11. Since the spindle 11 carries the cutting tool 12, the measurement of the axial thrust on the spindle 11 will be proportional to the axial thrust on the cutting tool 12.

The means for measuring the axial thrust on the spindle 11 include a pair of strain gauges 53 and 54 of opposite conductivity mounted on the spindle 11. Thus, the strain gauge 53 has a P-type semiconductivity and the strain gauge 54 has N-type semiconductivity. The spindle 11 has a second pair of strain gauges 55 and 56 (see FIG. 4), which are mounted on the spindle 11 and diametrically disposed to the strain gauges 53 and 54. The strain gauge 55 is of P-type semiconductivity and the strain gauge 56 is of N-type semiconductivity in the same manner as are the strain gauges 53 and 54.

By connecting the four strain gauges 53—56 in a bridge circuit, which is formed in the well-known manner of a Wheatstone bridge as shown in FIG. 6, the signals due to bending and torsional strains are cancelled out. Likewise, by mounting the strain gauges 53 and 54 and the strain gauges 55 and 56 on diametrically opposite sides of the spindle 11 with each set having its gauges of opposite polarity but equal gauge factor, any unwanted axial thermal expansion effects also are effectively cancelled. Accordingly, the signal, which results from the four strain gauges 53—56, is dependent solely upon the axial thrust on the spindle 11.

Since the strain gauges 53 and 55 have positive gauge factors, their resistances increase when they are elongated. Because the strain gauges 54 and 56 have negative gauge factors, their resistances decrease when they are elongated. Accordingly, when the strain gauges 53—56 are connected as shown in FIG. 6, they cooperate together to produce an amplified signal of the axial thrust on the spindle 11.

It should be understood that any other suitable means for measuring the axial thrust of the spindle 11 could be utilized instead of the foregoing arrangement. Suitable examples of other means for measuring the axial thrust of the spindle 11 are table mounted dynamometers such as manufactured by Lebow Associates, Detroit, Michigan.

Referring to FIGS. 7A—7E, there is shown the circuit of the control mechanism of the present invention by which the speed of rotation of the spindle motor 22 and the feed motor 19 are controlled. The control circuit includes an exponential functioning generating circuit 70 (see FIG. 7E). The circuit 70 includes a plurality of DC differential amplifier 71—76 and a plurality of matched PL1-N transdiodes 77—80. The amplifiers 71—76 and the transdiodes 77—80 of the circuit 70 are sold by Philbrick Researches, Inc. of Dedham, Massachusetts.

The output of the circuit 70 is the output signal of the amplifier 71, which is connected to the spindle motor 22 by a lead 81, a Zener diode 82 (see FIG. 7A), and a static frequency converter 83. The output signal from the amplifier 71 represents the cutting speed ratio of $V/V_{max}$.

The ratio $V/V_{max}$ is generated by the circuit 70 from the formula of $$\frac{V}{V_{max}} = [X^*(T^*)^{b/a}/X(t_o+60B/C)^{b/a}]^a \frac{V^*10}{V_{max}}$$

The inputs to the circuit 70 are to the transdiodes 78, 79 and 80.

In the formula, $V$ is the desired cutting speed of the cutting tool 12 in feet per minute for the specific cutting condition occurring at that instance as supplied to the circuit 70. $V_{max}$ is the maximum cutting speed in feet per minute at which it is desired for the cutting tool 12 to operate. The maximum cutting speed of the cutting tool 12 is dependent upon many different variables. The gear train 23 is appropriately adjusted so that $V_{max}$ is at least 2 $V^*$ where $V^*$ is a recommended cutting speed, which is selected from a handbook or from previous cutting done with the same type of cutting tool as the cutting tool 12 and a workpiece of the same material as the workpiece 14.

The input to the transdiode 78 is 10 $V^*/V_{max}$. This input to the transdiode 78 is supplied through actuating a base speed selector dial 84 until the correct $V^*$ appears on a meter 85 (see FIG. 7A) that indicates the base cutting speed, $V^*$. The selector dial 84 is mechanically connected (The mechanical connection is indicated by dashed line 84'.) to adjust the input to the meter 85 from a variable resistor 86.

The base speed selector dial 84 scales the output of a DC source 87 through a potentiometer 88 in accordance with the cutting speed $V^*$. As the cutting speed $V^*$ is increased by movement of the base speed selector dial 84, a larger signal is supplied to the transdiode 78 through moving the arm of the potentiometer 88 toward the DC source 87.

The input to the transdiode 79 is the product of $(T^*)^{b/a}$ and the numerator of $X^*/X$ and the input to the transdiode 80 is the product of $(t_c+60B/C)^{b/a}$ and the denominator of $X^*/X$. $X$ is the cutting parameter, which is measured during the cutting process. It indicates the relative machinability of the workpiece 14 as hardness, stock size, tool wear, and mutual rigidity between the cutting tool 12 and the workpiece 14 vary throughout a cut and from piece to piece. Furthermore, the form of $X$ is completely different for different operations such as milling, drilling, tapping, and reaming, for example.

$X^*$ is the value of the cutting parameter recorded from a previous cutting of another of the workpieces of the same material as the workpiece 14 with another of the cutting tools like the cutting tool 12 at the cutting speed $V^*$. $T^*$ is the tool life in minutes that resulted from the cut in which $V^*$ and $X^*$ were recorded.

The exponent $b$ is the exponent in Taylor's well-known law of metal cutting in which $VT^b$ is equal to a constant. The magnitude of the exponent $b$ varies and depends upon the cutting tool. For example, $b$ is equal to 0.2 for high speed steel cutters, 0.3 for carbide cutters, and 0.4 for ceramic cutting teeth.

The exponent $a$ is an empirical exponent that relates to the cutting parameters and is different for each type of operation. As an example, the exponent $a$ is 0.7 for milling. It reduces to 0.6 for boring. It further reduces to 0.5 for drilling, tapping, and reaming. It should be understood that these are broad examples of the values of the exponent $a$, which may actually be slightly different than given. However, the relationship of large to small as to the value of the exponent $a$ is in the manner given.

The average tool change time for the machine is $t_c$. The depreciation and regrind cost of the cutting tool 12 per tool life is $B$. The hourly labor, overhead, and burden rate cost of the machine is represented by $C$.

MACHINE USED FOR MILLING AND BORING

The parameter $X^*$ is a fixed quantity equal to the peak deflection of the cutting tool that occurred during the cutting operation in which $X^*$, $T^*$, and $V^*$ were recorded with a workpiece of the same material as the workpiece 14 and a cutting tool like the cutting tool 12. This peak deflection of the cutting tool is represented by $d^*$. Although the parameter $X^*$ is a constant, the control mechanism of the present invention generates the numerator and denominator of $X^*/X$ so that there is a single variable in the numerator of the ratio and a single variable in the denominator of the ratio. For milling and boring operations, $X^*/X$ is generated as $$\frac{d^*(2.3F_c100)}{\dfrac{.030(Rd_{max.})}{\dfrac{d_{max.}(d_x^2+d_y^2)}{.030d_{max.}^2}}100}$$

The number (2.3) can vary depending on the operation. It is inputed with a trimmer dial 121 in FIG. 7C. Thus, while $F_c$ is a variable during the cutting operation and is actually related to the parameter $X$, the ratio of $X^*/X$ is generated so that $F_c$ appears as part of the numerator of $X^*/X$.

$F_c$ is the peak cutting force tangential to the rotation of the cutting tool 12 and/or the workpiece 14. $R$ is the stiffness between the cutting tool 12 and the workpiece 14. $d_{max}$ is the smaller of the tolerance, in thousandths of an inch, desired for the machining operation or the limiting deflection of the tool-machine-workpiece system. $d_x$ is the deflection of the cutting tool 12 relative to the workpiece 14 in an $x$ coordinate direction while $d_y$ is the deflection of the cutting tool 12 relative to the workpiece 14 in a $y$ coordinate direction.

Accordingly, the input to the transdiode 80 is the variable denominator of $X^*/X$ scaled by $(t_c+60B/C)^{b/a}$ through actuation of a fixed cost selector dial 89 (see FIG. 7C) and is supplied by a lead 89'. During a particular cutting operation, the fixed cost selector dial 89 would not be varied once it was set. However, when other types of operations were to be performed, it would be necessary to again adjust the fixed cost selector dial 89 because some of the factors would change.

The input to the transdiode 79 (see FIG. 7E) is the variable numerator of $X^*/X$, which is scaled by $(T^*)^{b/a}$ through a base tool life selector dial 90 (see FIG. 7C), and is supplied by a lead 90'. Once the dial 90 has been set, it is not changed until another type of operation is to be performed or another type of material is to be cut. As long as the same type of piece is being cut in the same type of operation, the dial 90 is not changed after it has been set.

In order that the circuit 70 will generate the desired output from the amplifier 71, it is necessary to adjust the value of resistors 91 and 92 (see FIG. 7E) by an exponent selector dial 93. Thus, as previously mentioned, the value of the exponent $a$ of the formula that produces $V/V_{max}$ is different for each type of operation. Therefore, it is necessary to appropriately position the exponent selector dial 93 for the particular type of operation being performed by the machine with which the control mechanism of the present invention is being utilized.

When using the circuit 70, the output from the amplifier 71 will produce a signal equal to $V/V_{max}$. As previously mentioned, the output of the amplifier 71 is supplied through the lead 81 and the Zener diode 82 to the static frequency converter 83. However, the output signal is scaled through a potentiometer 94 (see FIG. 7A), which connects the lead 81 to the Zener diode 82. The value of the potentiometer 94 is determined through setting a maximum speed selector dial 95.

The scaling factor, which is introduced by the maximum speed selector dial 95, is $N_{max}/N$ where $N_{max}$ is the r.p.m. of the cutting tool 12 corresponding to $V_{max}$ and $N'$ is the maximum r.p.m. of the cutting tool 12 obtainable in the gear range selected for the gear train 23.

A Zener diode 96 limits the maximum value of the signal to the static frequency converter 83 while the Zener diode 82 limits the minimum value of the signal to the frequency converter 83. Accordingly, the signal supplied to the static frequency converter 83 from the amplifier 71 as modified through the potentiometer 94 is the ratio $N/N'$ of the r.p.m. desired for the cutting tool $N$ to the maximum r.p.m. obtainable in the gear range selected $N'$.

Accordingly, the static frequency converter 83 adjusts the speed of the spindle motor 22 in proportion to the command signal supplied thereto. It should be understood that the maximum speed selector dial 95 is not adjustable after a particular operation is started.

A tachometer generator 97 is mechanically connected to the spindle 11. Accordingly, the speed of rotation, $N$, of the spindle 11 ($N$ also represents the speed of rotation of the cutting tool 12 since it is directly connected to the spindle 11.) is transmitted to the tachometer generator 97 whereby the tachometer generator 97 provides an output of 10 $N/N'_{max}$ volts. This indicates the ratio of the r.p.m. of the spindle 11 $N$ to the maximum r.p.m. obtainable from the spindle 11 due to the maximum available gear range $N'_{max}$.

The output of the tachometer generator 97 is supplied through a lead 98 to a potentiometer 99. The arm of the potentiometer 99 is positioned by a diameter selector dial 100 (see FIG. 7C), which is mechanically connected (The mechanical connection is indicated by dashed line 100'.) to the arm of the potentiometer 99. The output of the tachometer generator 97 is scaled by the ratio of the diameter, $D$, of the cutting tool 12 to the cutting tool's maximum diameter, $D_{max}$, for which the machine is designed through positioning the arm of the potentiometer 99 by the diameter selector dial 100.

A pointer 101 of a meter 102 is positioned in accordance with the signal from the potentiometer 99. The pointer 101 indicates the cutting speed, $V$, of the cutting tool 12 in feet per minute on the meter 102.

The signal from the potentiometer 99 also is transmitted to the variable resistor 86. This signal from the potentiometer 99 is utilized at the variable resistor 86 when the operator sets $V^*$ on the meter 85 through adjusting the base speed selector dial 84.

To set the recommended cutting speed, $V^*$, on the meter 85, the operator must first position the diameter selector dial 100 in accordance with the diameter of the cutting tool 12. The gear range of the gear train 23 is then set in the range at which it is to operate. By rotating the motor 22 at its maximum speed in the selected gear range, the maximum cutting speed appears on the cutting speed meter 102. Then, positioning of the base speed selector dial 84 is made until the recommended cutting speed, $V^*$, appears on the base cutting speed meter 85. At this time, the transdiode 78 receives the desired input of 10 $V^*/V_{max}$ volts.

The signal from the tachometer generator 97 also is utilized to control the speed of the motor 19 whereby the feedrate of the table 16 is regulated. The signal from the tachometer generator 97 is supplied through a lead 103 to control the operation of the motor 19.

Thus, the output of the signal from the circuit 70 is utilized to control both the cutting speed of the cutting tool 12 and the feedrate of the table 16 relative to the cutting tool 12. Thus, the control mechanism of the present invention provides control of both the cutting tool and the relative movement between the cutting tool 12 and the workpiece 14 at the same time.

As previously mentioned, the input to the transdiode 79 includes the numerator of $X^*/X$ while the input to the transdiode 80 includes the denominator of $X^*/X$. When an operational selector dial 104 (see FIG. 7C) is positioned for a milling or boring operation, the numerator of $X^*/X$ is supplied from a lead 105 through a switch 106 to the transdiode 79 by the lead 90' while the denominator of $X^*/X$ is supplied from a lead 107 and a potentiometer 108 through a switch 109 to the transdiode 80 by the lead 89'. The switches 106 and 109 are mechanically connected to the operational selector dial 104 for movement together by the dial 104.

As previously mentioned, the numerator of $X^*/X$ is $$\frac{d^*}{.030} \frac{(2.3F_c 100)}{(Rd_{max.})}$$

This signal is generated on the lead 105.

As previously mentioned, the denominator of $X^*/X$, which is supplied to the transdiode 80, is generated as $$\frac{d_{max.}}{.030} \frac{(d_x^2+d_y^2)}{(d_{max.}^2)} 100$$

This signal is supplied to the transdiode 80 from the arm of the potentiometer 108, which is connected to the lead 107.

As previously mentioned, the numerator of $X^*/X$, which is supplied to the transdiode 79, contains the variable of $F_c$ although this is not actually part of $X^*$. Since this tangential cutting force is equal to the torque on the cutting tool 12 divided by the radius of the cutting tool 12, it is readily observed that the variable is the torque of the cutting tool 12. Since the cutting tool 12 is mounted in the spindle 11 through the holder, the torque of the spindle 11 may be utilized as the variable torque.

Accordingly, the torque of the spindle 11 is measured, as previously mentioned, through the spindle torque sensor unit or transducer 32. As previously mentioned, the spindle torque sensor unit 32 includes the bridge circuit comprised of the strain gauges 37—40 and is mechanically connected to the spindle 11. This mechanical connection is shown by dashed line 110 in FIG. 7A.

The strain gauges 37—40 of the spindle torque sensor unit 32 have an alternating signal of a predetermined frequency and phase supplied thereto through input contacts 110a and 110b (see FIG. 5) from an oscillator 111, which is energized from a DC power supply 112. The strain gauges 37—40 provide an alternating signal, which is dependent upon the strain developed by the torque of the spindle 11, through output contacts 112a and 112b (see FIG. 5) to an amplifier 113. The amplifier 113 is a conventional AC amplifier having a gain adjustment potentiometer 114 and a zero balancing adjustment 115.

The output of the amplifier 113 is connected to a demodulator 116, which is a detector and demodulator circuit of conventional and well-known type that receives an AC signal and produces a DC output signal directly proportional to the amplitude of the AC input signal. The demodulator 116 also receives a reference AC signal from the oscillator 111.

The amplifier 113 is set through adjustment of the zero balancing adjustment 115 so that the output of the demodulator 116 is zero when no torque is applied to the spindle 11. The potentiometer 114 is adjusted so that a maximum signal is obtained from the demodulator 116 as an output when the spindle 11 is subjected to its maximum torque.

Since the output of the demodulator 116 is equal to $10M/M_{max}$ volts where $M$ is the torque on the spindle 11 and $M_{max}$ is the maximum spindle torque capacity of the machine when the gear train 23 is in its lowest gear range, the maximum output of the demodulator 116 is 10 volts. This is when $M$ is equal to $M_{max}$.

The output of the demodulator 116 is supplied by a lead 116' to an operational amplifier 117 (see FIG. 7C), which is a DC amplifier, through a potentiometer 118 where the output of the demodulator 116 is scaled by $R_{max}/R$. The signal, $R_{max}/R$ter 118 by a rigidity selector dial 119.

As previously mentioned, $R$ is the stiffness between the cutting tool 12 and the workpiece 14. $R_{max}$ is the maximum radial stiffness achievable on the machine for a short stiff cutting tool.

The operational amplifier 117 also has its input signal further scaled by a potentiometer 120. The arm of the potentiometer 120 is positioned by the trimmer dial 121. The trimmer dial 121 positions the arm of the potentiometer 120 to scale the input to the amplifier 117 by 4.6 $M_{max}/0.030$ $R_{max}D A$max. Each of $M_{max}$, $R_{max}$, and $D_{max}$ is readily obtainable as previously mentioned. Thus, the trimmer dial 121 may be properly positioned.

The operational amplifier 117 functions to produce an output that is equal to the product of the input and the ratio of the resistance of the potentiometer 120, which is parallel to the amplifier 117, to the resistance of the potentiometer 118. The output of the amplifier 117 is the negative of the input. Operational amplifiers of this type are well known in the analogue computer art, and a description of them can be found in pages 11—13 of "Electronic Analogue Computers" by G. A. Horn and T. M. Horn (First edition published by McGraw-Hill Book Company in 1952.).

With the maximum resistance of the potentiometer 120 being 10 times the maximum resistance of the potentiometer 118, the output of the operational amplifier 117 is $$-\frac{4.6M}{.030RD_{max.}} 100 \text{ volts}$$

This negative signal is applied through a peak hold circuit, which comprises a diode 122 and a grounded capacitor 123, and a potentiometer 124 to an operational amplifier 125, which is a DC amplifier. The peak hold circuit permits the peak of the instantaneous signal from the output of the amplifier 117 to be supplied to the amplifier 125 as a DC signal input.

The input from the amplifier 117 to the amplifier 125 is scaled at the potentiometer 124 through positioning the arm of the potentiometer by a tolerance selector dial 126 (see FIG. 7B). The dial 126 is mechanically connected (This mechanical connection is indicated by dashed line 126'.) to the arm of the potentiometer 124 to position it in accordance with $d_{max}$ whereby the output of the operational amplifier 117 is scaled by $0.030/d_{max}$.

The input to the amplifier 125 is also scaled by a potentiometer 127. The position of the arm of the potentiometer 127 is adjusted by the diameter selector dial 100 and scales the input to the amplifier 125 by $D_{max}/D$. The maximum resistances of the potentiometers 124 and 127 are the same.

Accordingly, the output signal of the amplifier 125 is $$\frac{2.3F_c \ 100}{Rd_{max.}} \text{ volts}$$

Since the tangential cutting force, $F_c$, is equal to the torque of the spindle 11 divided by the radius of the cutting tool 12, $F_c$ is equal to $2M/D$.

The output from the amplifier 125 is supplied through a lead 128 and a potentiometer 129 to the lead 105. The value of the potentiometer 129 is determined through setting its arm by a base deflection selector dial 130. The dial 130 scales the signal on the lead 128 by $d^*/0.030$. Since $d^*$ is the peak deflection of the cutting tool that occurred during a previous cutting operation when using a workpiece having the same material as the workpiece 14 and a tool similar to the cutting tool 12 as previously mentioned, the base deflection selector dial 130 may appropriately position the arm of the potentiometer 129.

With the scaling of the signal on the lead 128 through the potentiometer 129, the signal supplied through the lead 105 is the desired numerator of $X^*/X$ as previously defined. Accordingly, with the switch 106 engaging the lead 105 as shown in FIG. 7C, the numerator of $X^*/X$ will be supplied through the lead 90' as an input to the transdiode 79 and scaled by $(T^*)^{b/a}$.

Accordingly, the desired signal is supplied to the transdiode 79 and varies only in accordance with the torque of the spindle 11. Thus, the signal to the transdiode 79 varies in accordance with the signal from the spindle torque sensor unit 32.

As previously mentioned, the denominator of $X^*/X$ is $$\frac{d_{max.}}{.030} \frac{(d_x{}^2+d_y{}^2)}{(d_{max.}{}^2)} 100$$

The only variables in this signal are $d_x$ and $d_y$.

The variables, $d_x$ and $d_y$, may be obtained from the strain gauges 31 on the deflection sensors 24. The strain gauges 31 on the deflection sensors 24 are connected in two bridge circuits to produce two deflection signals representing deflection of the spindle 11 in two coordinate axes normal to the spindle axis.

Each of the bridge circuits comprises four of the strain gauges 31. Each of the bridge circuits comprises the two strain gauges on each of two sensors disposed on opposite sides of the spindle 11. With one of the coordinate axes referenced as the $x$ axis and the other as the $y$ axis, the signal from one of the bridge circuits indicates the deflection $d_{sx}$ of the nose of the spindle 11 relative to the carrier of the spindle 11 along the $x$ coordinate axis and the other of the bridge circuits indicates the deflection $d_{sy}$ of the nose of the spindle 11 relative to the carrier of the spindle 11 in the $y$ coordinate direction.

Accordingly, the bridge circuit for the $x$ direction is designated in FIG. 7A as $d_{sx}$ sensor 131. The bridge circuit, which measures the deflection in the $y$ coordinate direction, is designated as $d_{sy}$ sensor 132.

The sensor 131 produces an alternating signal of an amplitude depending upon the amount of deflection along the $x$ axis of the nose of the spindle 11 relative to the carrier of the spindle 11. The circuit, which includes the sensor 131, is similar to the circuit for the spindle torque sensor 32 since the circuit includes an oscillator 133, an AC amplifier 134, and a demodulator 135. The DC power supply 112 is connected to the oscillator 133 in the same manner as it is connected to the oscillator 111 and for the same purposes. The AC amplifier 134 has a gain adjustment potentiometer 136 and a zero balancing adjustment 137 in the same manner as does the amplifier 113.

The output of the demodulator 135 is $$10\frac{d_{sx}}{d_{smax.}} \text{ volts}$$

where $d_{smax.}$ is equal to $F'_{max}/R_{max}$. $F'_{max}$ is the design safe load limit of the feed drives in the $x$ and $y$ coordinate directions. It should be understood that $F'_{max}$ is selected to be the lowest of these safe load limits if they should not be equal.

The amplifier 134 is set through adjustment of the zero balancing adjustment 137 so that the output of the demodulator 135 is zero when no deflection is occurring in the spindle 11 along the $x$ axis. The potentiometer 136 is adjusted so that the maximum signal is obtained for the demodulator 135 when the spindle 11 is subjected to its maximum deflection along the $x$ axis; this is when $d_{smax.}$ is equal to $d_{sx}$.

The output of the demodulator 135 is supplied through a lead 138 and a potentiometer 139 (see FIG. 7B) to an operational amplifier 140, which is a DC amplifier. The potentiometer 139 has its arm adjusted by a transfer number selector dial 141. The resistance of the potentiometer 139 is reduced as the magnitude of the transfer number is increased. The transfer number, $K$, depends upon the stiffness of the cutting tool 12, the stiffness of the holder of the cutting tool 12, the stiffness of the spindle 11, and the machine structural stiffness.

In addition to scaling the output of the demodulator 135 through the potentiometer 139 by the ratio of $d_x/d_{sx}$ (This is the transfer number $K$.), the output of the demodulator 135 also is scaled by a potentiometer 142 prior to being supplied as an input to the operational amplifier 140. The position of the arm of the potentiometer 142 is determined by the tolerance selector dial 126 whereby the output of the demodulator 135 is scaled by $0.001/d_{max}$.

With the ratio of the maximum resistance of the potentiometer 142 to the maximum resistance of the potentiometer 139 being the ratio of $10d_{smax.}/0.001$, the output of the operational amplifier 140 is $100\,d_x/d_{max}$ volts and is supplied as an input to both an inverter amplifier 143 and a quarter-square multiplier 144. One suitable example of the quarter-square multiplier is Model No. 3732, sold by Systron Donner Scientific Company. The associated inverter amplifier 143 is a DC amplifier that inverts or changes the sign of its input and supplies its output to the multiplier 144. The output of the quarter-square multiplier 144 is $-100\,d_x{}^2/d_{max}{}^2$ volts.

In a similar manner to the $d_{sx}$ sensor 131, the $d_{sy}$ sensor 132 functions to produce an output at its demodulator 145 (see FIG. 7A), which is equal to $10\,ds_y/ds_{max}$ volts. The circuit includes an oscillator 146, which is connected to the DC power supply 112, and an AC amplifier 147. The AC amplifier 147 has a gain adjustment potentiometer 148 and a zero balancing adjustment 149. Since the adjustments are made in the same manner as described for the amplifier 134, the adjustments will not be described.

The output of the demodulator 145 is supplied through a lead 150 and a potentiometer 151 (see FIG. 7B) to an operational amplifier 152, which is a DC amplifier. The potentiometer 151 scales the output of the demodulator 145 by the ratio of $d_y/d_{sy}$ in accordance with the position of its arm; this position is determined by the transfer number selector dial 141. Furthermore, the output of the demodulator 145 is scaled by $.001/d_{max}$, through positioning the arm of a potentiometer 153, before the signal is supplied as an input to the operational amplifier 152. The position of the arm of the potentiometer 153 is determined by the tolerance selector dial 126.

With the ratio of the maximum resistance of the potentiometer 153 to the maximum resistance of the potentiometer 151 being equal to the ratio of $10d_{smax.}/0.001$, the output of the amplifier 152 is $100\,d_y/d_{max}$ volts. This signal is supplied as an input to both a quarter-square multiplier 154 and its associated inverter amplifier 155. These are similar to the multiplier 144 and the amplifier 143. The output of the multiplier 154, which receives an input from the amplifier 155 as well as from the amplifier 152, is $-100\,d_y{}^2/d_{max}{}^2$ volts.

The outputs from the multipliers 144 and 154 are supplied as inputs to an operational amplifier 156, which is a summer and inverter for the two input signals and is described in the previously cited portion of "Electronic Analogue Computers." Thus, the output of the amplifier 156 is $$100\frac{(d_x{}^2+d_y{}^2)}{(d_{max.}{}^2)} \text{ volts}$$

The output of the amplifier 156 is supplied to a peak hold circuit, which comprises a diode 157 and a grounded capacitor 158, whereby only the peak signal of the output of the amplifier 156 is supplied to the lead 107 and a lead 159. Since the lead 107 is connected through the potentiometer 108 (see FIG. 7C) before the signal passes to the transdiode 80, the signal to the transdiode 80 is $$\frac{d_{max.}}{.030} \frac{(d_x{}^2+d_y{}^2)}{d_{max.}{}^2} 100 \text{ volts}$$

This is the denominator of $X^*/X$.

Thus, only the deflection of the cutting tool 12 is a variable in the input to the transdiode 80 during the cutting operation. Accordingly, the sensors 131 and 132 along with the appropriate circuitry produce this desired signal in accordance with the deflection of the cutting tool 12 relative to the workpiece 14.

Thus, with the spindle torque sensor 32 producing a signal in accordance with the torque on the spindle 11 and the sensors 131 and 132 creating signals to indicate the deflection of the cutting tool 12, the circuit 70 generates a signal in accordance with the torque of the spindle 11 and the total deflection of the cutting tool 12. This determines whether the speed of the spindle motor 22 should be increased or decreased.

As previously mentioned, a positive voltage, which is proportional to the rotational speed of the spindle 11, is supplied through the lead 103. The lead 103 supplies this signal as an input to a differential amplifier 160 (see FIG. 7D). If this is the only input to the differential amplifier 160, the motor 19 will be driven in response to the magnitude of the signal on the lead 103. That is, as the potential on the lead 103 is increased, the speed of the motor 19 increases to increase the feedrate of the table 16.

The differential amplifier 160 is a DC summing amplifier of the type described in the previously cited portion of "Electronic Analogue Computers." The negative and positive input signals to the differential amplifier 160 are summed to produce an output correlated to the input.

The signal is supplied from the differential amplifier 160 through a diode 161 to a potentiometer 162 and then through a lead 163 to a power amplifier 164 (see FIG. 7A). The output of the power amplifier 164 is supplied through a controller 165, which regulates the speed of the motor 19.

The output of the amplifier 160 is scaled by the potentiometer 162 through positioning its arm by a maximum feedrate selector dial 166. The dial 166 determines the maximum feedrate of the table 16 through appropriately positioning the arm of the potentiometer 162. The magnitude of the signal supplied from the potentiometer 162 through the lead 163 to the power amplifier 164 is limited by a grounded Zener diode 167. Thus, the maximum voltage to the power amplifier 164 is limited by the Zener diode 167 irrespective of the potential from the potentiometer 162.

Accordingly, while it is normally desired for the table 16 to be fed at a rate directly proportional to the speed of rotation of the cutting tool 12, it is desired to limit the loading of the cutting tool 12, the workpiece 14, and the machine. These limits are called constraints and function to protect the machine from overloading.

One of these constraints is to prevent stalling of the spindle motor 22. Accordingly, it is desired to keep the ratio of the current, $I$, to the spindle motor 22 to the maximum current, $I_{max}$, to the spindle motor 22 to less than one. After the constraint ratio of $I/I_{max}$ has reached a predetermined value, it is desired to reduce the feedrate of the table 16 linearly as the constraint ratio exceeds its predetermined value. In controlling the machine utilized with the present invention, it is desired that all of the constraint ratios have a predetermined value of 0.8 beyond which it is desired for the feedrate of the table 16 to be reduced.

A signal, which indicates when the constraint ratio exceeds its value of 0.8 and the amount of excess, is supplied to the differential amplifier 160 for each of the various constraints. Thus, for the spindle motor constraint, a motor current sensor 168 (see FIG. 7A) is utilized to provide an output of $-10\ I/I_{max}$ volts.

The sensor 168 may be a Hall effect device such as that marketed by Scientific Columbus as Model No. 35–542. The sensor 168 also may be a device that produces a DC voltage proportional to the voltage drop across a shunt in the DC section of the static frequency converter 83, which controls the rate of the spindle motor 22.

The signal from the sensor 168 is supplied through a diode 169 and a lead 170, a switch 171 (see FIG. 7D), and a lead 171' to the differential amplifier 160 when the switch 171 connects the leads 170 and 171' to each other. The switch 171 connects the leads 170 and 171' to each other during milling and boring operations.

The diode 169 has a positive voltage source 172 (see FIG. 7A) of 8 volts connected thereto in addition to the output of the sensor 168. As long as the output of the sensor 168 is less than the positive voltage source 172, the diode 169 will not conduct so that no signal will be supplied to the differential amplifier 160. However, when the output of the sensor 168 exceeds $-8$ volts, which is when the constraint ratio for the spindle motor current exceeds 0.8, then the diode 169 conducts to supply a negative signal to the differential amplifier 160.

Thus, as the constraint ratio increases as indicated by the output of the sensor 168, the output of the differential amplifier 160 linearly decreases irrespective of the signal from the lead 103. Therefore, the feedrate of the table 16 is reduced.

Since the current sensor 168 would stop the drive of the motor 19 when the output of the sensor reached 10 volts to indicate $I$ is equal to $I_{max}$, the control circuit of the present invention provides means to prevent the table 16 from being stopped as the output of the signal from the differential amplifier 160 decreases due to an increase in the signal from the current sensor 168.

Accordingly, a lead 173 (see FIG. 7D) is connected to the lead 103 to transmit the signal therefrom through potentiometers 174 and 175 and a diode 176 to the lead 163. The arm of the potentiometer 174 is positioned by the maximum feedrate selector dial 166 while the arm of the potentiometer 175 is positioned by a minimum feedrate selector dial 177.

When the signal from the amplifier 160 decreases below the signal from the potentiometer 175, the diode 176 conducts and a diode 178 in the lead 163 ceases to conduct. As a result, the power amplifier 164 receives its input from the lead 173 to provide the minimum feedrate signal for driving the motor 19.

When the constraint ratio decreases so that the signal from the differential amplifier 160 is greater than the signal from the potentiometer 175, the diode 178 again conducts and the diode 176 ceases to conduct. As a result, the motor 19 is again governed by the signal from the amplifier 160 rather than the minimum signal from the lead 173. It should be understood that the signal from the amplifier 160 will govern the motor 19 with the constraint ratio being substantially high but not sufficiently high so as to produce a signal below the minimum feedrate signal.

Another of the constraints is to prevent breakage of the cutting tool, damage to the workpiece, or damage to the machine. This constraint depends upon the deflection of the cutting tool 12 relative to the workpiece 14. In roughing cuts, it is desired to limit the ratio of $(d_x^2+d_y^2)^{1/2}/d_{max}$ to less than one. As previously mentioned, $d_{max}$ is the smaller of the tolerance desired for the machining operation or the limiting deflection of the cutting tool-machine-workpiece system.

This constraint ratio signal is obtained from a square root module 179 (see FIG. 7D), which is a quarter-square multiplier like the multipliers 144 and 154 and switched to a square root operation, and its associated operational amplifier 180 and a stabilizing diode 181. The input to the square root module 179 is obtained from the lead 159, which receives the output of the amplifier 156 (see FIG. 7B). Thus, the input to the square root module 179 is $100\ (d_x^2 d_y^2/d_{max}^2)$ volts. The output of the square root module 179 is $-100\ (d_x^2 d_y^2)^{1/2}/d_{max}$ volts.

The output of the square root module 179 is supplied by a lead 182, a switch 183, a lead 184, a diode 185, and a lead 186 to the amplifier 160. The switch 183 connects the leads 182 and 184 to each other only during roughing operations. Thus, the signal to the amplifier 160 is supplied from the square root module 179 only during roughing. As previously mentioned, this is when it is desired that this constraint ratio be effective.

As previously mentioned, all of the constraint ratios are selected so that the signal from the operational amplifier 160 to drive the table 16 begins to decrease after the ratio exceeds 0.8. Accordingly, a positive DC voltage source 187 is connected to the lead 184 between the diode 185 and the switch 183. As a result, the output of the square root module 179 must exceed the positive voltage of the source 187 before the diode 185 permits the negative signal from the square root module 179 to be supplied to the differential amplifier 160.

Since the maximum output of the square root module 179 is $-100$ volts when $(d_x^2+d_y^2)^{1/2}$ is equal to $d_{max}$, the voltage of the source 187 is 80 volts. Thus, the output of the square root module 179 must exceed $-80$ volts to indicate that the ratio of $(d_x^2+d_y^2)^{1/2}/d_{max}$ is greater than 0.8. When this occurs, the signal from the amplifier 160 to the power amplifier 164 starts to decrease.

As previously mentioned with respect to the constraint ratio for the spindle motor current, the signal from the potentiometer 175 maintains a minimum feedrate of the table 16 even if the constraint ratio exceeds the value at which the signal from the differential amplifier 160 decreases below the desired minimum feedrate.

Another of the constraints is during finishing operations when it is desired to maintain the deflection of the cutting tool 12 normal to the surface being machined within the prescribed tolerance. This constraint ratio is $[(d_x^2+d_y^2)-F_c^2/R^{2au|1|/2}/d_{max}$. Again, it is desired to keep this ratio less than one and to reduce the feedrate of the table 16 as this ratio increases beyond the predetermined value of 0.8.

The ratio signal is developed from the outputs of the amplifiers 125 (see FIG. 7C) and 156 (see FIG. 7B). The output of the amplifier 125, which has previously been described as being supplied through the lead 128 as an input to the transdiode 79, also is supplied as an input to a quarter-square multiplier 188 and its associated operational amplifier 189 similar to the multipliers 144 and 154 and the amplifiers 143 and 155. The output of the multiplier 188 is supplied by a lead 190 to an operational amplifier 191 (see FIG. 7D), which also is connected by a lead 192 to the lead 107 (see FIG. 7B) whereby the output of the amplifier 156 is supplied as an input to the amplifier 191.

The output of the amplifier 191 is supplied as the input to a square root module 193, which is a quarter-square multiplier similar to the multipliers 144 and 154 and switched to square root operation. The square root module 193 and its associated operational amplifier 194 and a stabilizing diode 195 produce an output on a lead 196 of $$\frac{-100}{d_{max.}}\left[(d_x^2+d_y^2)-\frac{F_c^2}{R^2}\right]^{1/2} \text{ volts}$$

When this negative signal exceeds the positive voltage of a DC source 197, a diode 198 transmits a negative signal through a lead 199, which has a switch 199' therein, to the differential amplifier 160.

Since the maximum output of the square root module 193 is −100 volts and this is when the ratio is one, the source 197 has a potential of 80 volts. Thus, as the signal from the square root module 193 exceeds −80 volts, the ratio exceeds 0.8 whereby it is desired to slow down the feedrate of the table 16. This is when the diode 198 conducts to supply a negative signal to the differential amplifier 160.

It should be understood that the signal from the potentiometer 175 insures that the motor 19 moves the table 16 at a minimum feedrate even when the output of the operational amplifier 160 decreases below this required minimum feedrate due to the signal from the square root module 193. This is the same arrangement as previously described for the other constraint signals.

It should be understood that the signal from the square root module 193 is supplied during roughing operations as well as finishing operations. However, the signal on the lead 186 during roughing operations is much larger than the output from the square root module 193 because the signal from the square root module 193 is reduced by $F_c^2/R^2$ in the square root module 193 but not in the square root module 179. Thus, the signal on the lead 186 governs during roughing operations.

It also is desired to limit the torque of the cutting tool 12 so that this is another constraint. This constraint prevents excessive twist of the cutting tool 12, the workpiece 14, or the drive of the spindle 11.

To obtain this constraint, it is necessary that the ratio of $M/M_{lim}$ be less than one. When the ratio of $M/M_{lim}$ becomes greater than 0.8, it is desired to reduce the feedrate of the table 16 in the same manner as described for the other constraints. $M_{lim}$ is the limiting torque to which it is desired that the cutting tool 12 be subjected.

The ratio of $M/M_{lim}$ is obtained by scaling the output of the demodulator 116 by $M_{max}/M_{lim}$ through positioning the arm of a potentiometer 200 (see FIG. 7C) by a torque limit selector dial 201. Since the output of the demodulator 116 is $10M/M_{max}$ volts, the input to an operational amplifier 202, which is a DC amplifier, is $10M/M_{lim}$ volts.

Since the resistance of a resistor 202′, which is in parallel with the amplifier 202, is 10 times the maximum resistance of the potentiometer 200, the operational amplifier 202 provides a negative output of $-100M/M_{lim}$ volts. The negative output is supplied through a peak hold circuit, which comprises a diode 203 and a grounded capacitor 204, a lead 205 (see FIGS. 7E and 7D), and a lead 206 (see FIG. 7D) to a diode 207. The peak hold circuit passes only the instantaneous peak negative signal from the operational amplifier 202.

The diode 207 is connected through a switch 208 and a lead 209 to the differential amplifier 160 during milling and boring operations. Since a positive DC voltage source 210 also is connected to the diode 207, the negative signal from the operational amplifier 202 must exceed the positive potential of the DC source 210. Since the maximum output of the amplifier 202 is −100 volts, the source 210 has a positive potential of 80 volts. Thus, when the constraint ratio exceeds 0.8, the diode 207 conducts and causes the differential amplifier 160 to decrease its signal to the power amplifier 164. The signal from the differential amplifier 160 will decrease as the negative signal from the amplifier 202 increases.

As previously mentioned for the other constraints, the output of the differential amplifier 160 ceases to be supplied to the power amplifier 164 when it decreases below the value of the potential supplied from the potentiometer 175 through the diode 176. This insures that the minimum feedrate of the table 16 is maintained.

The signal from the amplifier 202 also is utilized to position a pointer 211 of a spindle torque meter 212 (see FIG. 7E). The meter 212 visually indicates the torque ratio through the position of the pointer 211.

The last of the constraints is the axial thrust force on the cutting tool 12. This constraint would not be applicable during a milling operation but is applicable during a boring operation. It is desired that the ratio of $F/F_{max}$ be less than one in the same manner as for the other constraints where $F$ indicates the axial thrust on the cutting tool 12 while $F_{max}$ is the maximum axial thrust to which the cutting tool 12 may be subjected. $F_{max}$ may be equal to $F'_{max}$. Furthermore, it is desired to reduce the feedrate of the table 16 as soon as the constraint ratio of $F/F_{max}$ becomes greater than the predetermined value of 0.8.

Since the cutting tool 12 is mounted in the spindle 11, the axial thrust on the cutting tool 12 may be obtained by measuring the axial thrust on the spindle 11. Accordingly, the axial thrust of the spindle 11 is measured through a spindle thrust sensor unit 213 (see FIG. 7A).

The spindle thrust sensor unit 213 includes a bridge circuit comprised of the strain gauges 53—56 (see FIG. 6) and mechanically connected to the spindle 11. This mechanical connection is shown by dashed line 214 in FIG. 7A.

The strain gauges 53—56 of the spindle thrust sensor unit 213 have an alternating signal of a predetermined frequency and phase supplied thereto at contacts 214a and 214b (see FIG. 6) from an oscillator 215, which is energized from the DC power supply 112. The strain gauges 53—56 provide an alternating signal, which is dependent upon the axial thrust produced on the spindle 11, as an output through output contacts 215a and 215b (see FIG. 6) to an amplifier 216. The amplifier 216 is a conventional AC amplifier having a gain adjustment potentiometer 217 and a zero balancing adjustment 218.

The output of the amplifier 216 is connected to a demodulator 219, which is the detector and demodulator circuit of the conventional well-known type that receives an AC signal and produces a DC output signal directly proportional to the amplitude of the AC input signal. The demodulator 219 also receives a reference AC signal from the oscillator 215.

The amplifier 216 is set through adjustment of the zero balancing adjustment 218 so that the output of the demodulator 219 is zero when no axial thrust is applied to the spindle 11. The potentiometer 217 is adjusted so that a maximum signal is obtained from the demodulator 219 as an output when the spindle 11 is subjected to its maximum axial thrust. Since the output of the demodulator 219 is equal to $-10F/F_{max}$ volts, the maximum output of the demodulator 219 is −10 volts; this is when $F$ is equal to $F_{max}$.

The output of the demodulator 219 is supplied to the differential amplifier 160 through a lead 220, a lead 221 (see FIG. 7C) having a switch 221' (see FIG. 7D) therein, and a lead 222 having a diode 223 therein. The diode 223 has a positive DC voltage source 224 connected thereto on the same side as the output of the demodulator 219. Accordingly, the negative signal from the demodulator 219 is not supplied to the differential amplifier 160 until the negative output of the demodulator 219 exceeds the positive potential of the DC source 224.

Since the maximum output of the demodulator 219 is −10 volts and it is desired to reduce the feedrate of the table 16 only after the constraint ratio of the axial thrust exceeds 0.8, the potential of the source 224 is 8 volts. Accordingly, the diode 223 conducts only when the signal from the demodulator 219 exceeds −8 volts to allow the negative signal to be supplied to the differential amplifier 160.

As the negative signal from the demodulator 219 increases beyond −8 volts, the output of the differential amplifier 160 decreases. This results in a linear reduction of the feedrate of the table 16 as the negative output of the demodulator 219 increases.

In the same manner as previously described for the other constraint signals, the signal from the potentiometer 175 insures that the feedrate of the table 16 is maintained at a predetermined minimum. Thus, the signal from the differential amplifier 160 ceases to be effective when it decreases to a value below that of the signal from the potentiometer 175.

The negative signal from the demodulator 219 also is utilized to position a pointer 225 of an axial thrust force meter 226. The signal is supplied from the lead 221 by a lead 227 to position the pointer 225.

It should be understood that the differential amplifier 160 sums all of the constraint signals; thus, it is responsive to all of the constraint signals. However, the largest of the constraint signals is the signal that the differential amplifier 160 primarily responds to and prevents from becoming larger. If the largest constraint signal is prevented from reaching its limit, then none of the other constraint signals can reach its limit because the axial, radial, and tangential forces are proportional to each other for a given set of conditions.

If cutting conditions change so that another constraint signal becomes the largest, then the output of the differential amplifier 160 controls the feedrate of the table 16 to prevent this constraint signal from reaching its limit. Of course, this prevents each of the other signals from reaching its limit since they are related. The behavior of the output of the differential amplifier 160 versus the different constraint signals is shown near the bottom of FIGS. 8, 9, and 11.

When the cutting tool 12 is not engaged with the workpiece 14, it is desired that the feedrate of the table 16 be substantially higher than the maximum feedrate of the table 16 when the cutting tool 12 is cutting the workpiece 14. The present invention includes an override network, which is known as a gap eliminator, that functions when there is no engagement between the cutting tool 12 and the workpiece 14 to substantially increase the feedrate of the table 16 beyond its maximum feedrate during cutting operations. Where a series of separated cuts is being made in the workpiece 14 whereby the cutting tool 12 is not engaging the workpiece 14 between the separated cuts, for example, this substantial increase in the feedrate of the table 16 reduces the total time for the cutting operation.

In the present invention during milling and boring operations, the rapid feedrate of the table 16 occurs whenever the cutting tool 12 is not subjected to a torque, any deflection, or any axial thrust. If the cutting tool 12 is subjected to a torque, a deflection, or an axial thrust, this indicates that the cutting tool 12 is engaging the workpiece 14. Accordingly, when this occurs, it is not desired to have the table 16 fed at the rapid feedrate.

The override network, which produces a signal to cause the table 16 to be fed at a rate as high as four times the maximum feedrate of the table 16 when cutting of the workpiece 14 is occurring, produces the signal only when there is substantially no output from any of the demodulators 116, 135, 145, and 219 (see FIG. 7A). The override network includes a differential amplifier 228 (see FIG. 7D) having its output supplied through a potentiometer 229 and a diode 230 as an input to the potentiometer 162.

The arm of the potentiometer 229 is positioned by the maximum speed selector dial 95 (see FIG. 7A) through a mechanical connection (indicated by dashed line 230' in FIGS. 7A and 7D). This scales the output of the amplifier 228 by $N_{max}/N'$.

When the cutting tool 12 is under no load, the output of the differential amplifier 228 is such that the diode 230 conducts and the diode 161 does not conduct. Since the output of the differential amplifier 228 under no load conditions may be as high as four times as great as the output of the differential amplifier 160 to the diode 161, the diode 230 conducts and the diode 161 ceases to conduct when the cutting tool 12 is under no load conditions. When this occurs, the signal to the power amplifier 164 is from the differential amplifier 228 rather than from the differential amplifier 160 whereby the larger signal from the differential amplifier 160 whereby the larger signal from the differential amplifier 228 causes the feedrate of the table 16 to be capable of being increased up to four times the maximum feedrate at which the table 16 moves when it receives its signal from the differential amplifier 160 depending on the setting of the potentiometer 162 by the maximum feedrate selector dial 166.

The inputs to the differential amplifier 228 include the output from the square root module 179 through the lead 182 and a lead 231 having a switch 231' therein. This input is $-100(d_r^2 8zd_u^2)^{1/2}/d_{max}$ volts. This signal is supplied to the differential amplifier 228 irrespective of the position of the switch 183 when the switch 231' is closed.

Another of the inputs to the differential amplifier 228 is from the demodulator 116, which produces a signal proportional to the torque exerted on the cutting tool 12. This signal is supplied to the amplifier 228 from the lead 205 by a lead 232. The signal supplied to the differential amplifier 228 over the lead 232 is $-100M/M_{lim}$ volts.

The third input to the differential amplifier 228 indicates when the spindle 11 and the cutting tool 12 are subjected to an axial thrust. This signal is provided by a lead 233 from the lead 221 and is $-10F/F_{max}$ volts.

The leads 231, 232, and 233 are connected to a common lead 234, which is connected to the input of the differential amplifier 228. The lead 234 has a positive DC voltage source 235 connected thereto.

When the inputs from the lead 231—233 are zero, then the differential amplifier 228 has its maximum output, and this is equal to the potential of the DC source 235. With the DC source 235 being 6 volts, then the output of the differential amplifier 228 is 6 volts.

When the output of the differential amplifier 228 is 6 volts (It is scaled by $N_{max}/N'$ through the arm of the potentiometer 229.), the signal on the anode side of the diode 230 is $6N_{max}/N'$ volts. Since the maximum output from the differential amplifier 160 is 1.5 $N_{max}/N'$ volts, it is readily observed that the output supplied to the diode 230 is four times the output supplied to the diode 161.

While the maximum output supplied to the diode 230 is four times the output supplied to the diode 161 so that the feedrate of the table 16 can be increased by the gap eliminator network to four times that when the cutting tool 12 is engaging the workpiece 14, the increase of the feedrate depends on the setting of the potentiometer 162. This is because the Zener diode 167 limits the voltage to the power amplifier 164 from the potentiometer 162 to 1.5 volts. Thus, the potentiometer 162 must be set by the maximum feedrate selector dial 166 so that no more than 25 percent of the voltage from the diode 161 or the diode 230 is supplied to the power amplifier 164 for the feedrate of the table 16 to be increased by the gap eliminator network to four times the maximum feedrate obtainable when the cutting tool 12 is engaging the workpiece.

If the potentiometer 162 is set to permit more than 25 percent of the voltage from the diode 161 or the diode 230 to be supplied therefrom, the Zener diode 167 limits the signal from the diode 230 to 1.5 volts. With over 25 percent of the output from the diode 161 being supplied from the potentiometer 162, the 1.5 volt maximum signal, which the Zener diode 167 permits the diode 230 to supply to the power amplifier 164, cannot increase the feedrate of the table 16 to four times the maximum obtainable when the cutting tool 12 is engaging the workpiece 14 since this would not be four times the maximum signal from the diode 161 (The maximum signal from the diode 161 would now be greater than 25 percent of the maximum 1.5 volts from the diode 167.).

For the great majority of the time of operation, the potentiometer 162 is set by the maximum feedrate selector dial 166 to transmit 25 percent or less of the voltage from the diode 161 or the diode 230 so that the gap eliminator network produces a feedrate four times the maximum feedrate obtainable when the cutting tool 12 is engaging the workpiece 14. In the remaining time when the potentiometer 162 is set to transmit more than 25 percent of the voltage from the diode 161 or the diode 230, the gap eliminator network does not produce a feedrate four times the maximum obtainable when the cutting tool 12 is engaging the workpiece 14.

Whenever the signal on the lead 231 is −2 volts, the output signal of the differential amplifier 228 is zero. Thus, for a very small deflection of the cutting tool 12 (The maximum output on the lead 231 is 100 volts.), the fast feedrate of the table 16 is stopped.

Likewise, whenever the signal on the lead 232 is −2 volts, the differential amplifier 228 again has zero output. Thus, this small signal, which is indicative of a small torque on the spindle 11 (The maximum signal on the lead 232 is 100 volts.), results in the feedrate of the table 16 again being controlled by the output of the differential amplifier 160.

When the signal on the lead 233 becomes −0.2 volts, the differential amplifier 228 again has zero output. This is indicative of a small axial thrust on the spindle 11 and the cutting tool 12 since the maximum signal on the lead 233 is 10 volts. Again, this reduces the feedrate of the table 16 and the table 16 is controlled by the output of the differential amplifier 160.

The lead 234 has a grounded diode 236 connected thereto to limit the output of the differential amplifier 228 to a signal level no more negative than −2 volts. A diode 237 in the lead 234 functions to isolate the differential amplifier 228 from the input signals when the inputs exceeds −2 volts.

Thus, the override network controls the feedrate of the table 16 only when the cutting tool 12 is not engaging the workpiece 14. As soon as there is engagement between the cutting tool 12 and the workpiece 14, the signal on either the lead 231 or 232 exceeds −2 volts or the signal on the lead 233 exceeds −0.2 volt. Thus, the rapid feedrate of the table 16 is quickly stopped by whichever of the foregoing signals occurs first.

The output signal from the square root module 179 on the lead 182 also is supplied to a potentiometer 238. By scaling the output by $d_{max}/0.030$ through positioning the arm of the potentiometer 238 by the tolerance selector dial 126 (The mechanical connection from the arm of the potentiometer 238 to the dial 126 is shown by dashed line 238' in FIGS. 7B and 7D.), a signal is supplied to position a pointer 239 of a cutter deflection meter 240. This indicates the resultant deflection of the cutting tool 12 relative to the workpiece 14. The deflection is calibrated in inches on the scale of the meter 240.

The control mechanism of the present invention includes a network for indicating when the life of the cutting tool 12 has ended. When the cutting tool 12 has worn to the point where the separating forces on the cutting tool 12 are over 2.3 times the tangential cutting force $F_c$, the life of the cutting tool 12 for a milling or boring operation is ended. These conditions mean that the cutting tool 12 has reached either a critical state of wear or work hardening, which is dangerous to the workpiece 14, is occurring. In either situation, the cutting tool 12 should be replaced.

Accordingly, the output from the operational amplifier 189 (see FIG. 7C), which provides the negative of the output of the amplifier 125 as its output, is compared with the output from the amplifier 156 (see FIG. 7B). The output from the operational amplifier 189 is $$-\frac{2.3F_c}{Rd_{max}}100 \text{ volts}$$

and the output from the amplifier 156 is $$100\frac{(d_x^2+d_y^2)}{d_{max}^2} \text{ volts}$$

When the positive output of the amplifier 156 exceeds the negative output of the amplifier 189, the life of the tool 12 is ended. Accordingly, this is when it is desired for a signal to indicate end of the life of the cutting tool 12.

The tool life network includes a differential amplifier 241 (see FIG. 7C), which receives the negative output from the amplifier 189 by a lead 242 and a switch 243 as an input. The positive output of the amplifier 156 is supplied as an input to the differential amplifier 241 from the lead 107 by a lead 244 and a switch 245.

The switches 243 and 245 are disposed in the position of FIG. 7C, whereby the leads 242 and 244 are connected as inputs to the differential amplifier 241, by the operational selector dial 104. As previously mentioned, the dial 104 also positions the switches 106 and 109.

When the sum of the positive signal on the lead 244 and the negative signal on the lead 242 becomes zero, a positive output is supplied from the differential amplifier 241 by a lead 246 to a microswitch 247 to cause actuation thereof. When the microswitch 247 is energized, it may close a switch to energize a warning light, for example. Furthermore, the actuation of the microswitch 247 could be utilized to retract automatically the feed table 16.

It should be understood that a signal is supplied from a minimum feed detector 248 (see FIG. 7D), which is a current sensor that is actuated when current is flowing through the diode 176 to the power amplifier 164, to indicate that the feedrate of the table 16 is at the predetermined minimum. This could be an audio or visual signal to warn the operator that tool load and wear can no longer be safely controlled.

The output of the detector 248 could produce an intermittent signal unless the feedrate of the table 16 was at the predetermined minimum for a predetermined period of time. The output of the detector 248 could be utilized to cause retraction of the tool 12 from the workpiece 14. Thus, the output of the detector 248 could actuate a relay 249, which is mechanically connected to the feed motor 19 (The mechanical connection is indicated by dashed line 249'.), to cause reversal of the feed motor 19.

SUMMARY OF MILLING AND BORING OPERATIONS

Considering the operation of a machine utilized for milling or boring with the control mechanism of the present invention, reference should be made to FIG. 8 wherein a block diagram shows the pertinent portions of the circuit of FIGS. 7A—7E. The circuit 70 provides an output, which is proportional to $V/V^*$ to the spindle drive. This results in the spindle 11 being rotated at a speed in accordance with the input to the motor 22. The inputs to the circuit 70 include the fixed inputs of $$(T^*)^{b/a}, \left(t_o+\frac{60B}{C}\right)^{b/a}, a, R, D, V^*, \text{ and } d^*$$

All of these inputs are fixed for a specific machine cutting operation although they do vary for the different cutting operations of milling and boring.

In addition, the circuit 70 receives a first variable input, which is dependent upon the output of the torque sensor unit 32, and a second variable input, which is dependent on the outputs of the $d_r$ sensor unit 131 and the $d_{su}$ sensor unit 132.

Since the torque and the deflection of the cutting tool 12 vary during the cutting process, these signals are utilized to control the rate of rotation of the spindle 11 through varying the output of the circuit 70. The output of the circuit 70 is logarithmically related to the variable inputs. This provides a precise control of the speed of rotation of the cutting tool 12 in accordance with the existing cutting parameters.

The feed drive, which advances the table 16 relative to the cutting tool 12, is controlled in response to the speed of rotation of the cutting tool 12. Thus, as the speed of rotation of the cutting tool 12 increases, the feedrate of the table 16 increases unless certain other conditions occur. Thus, if any of the ratios of the constraints should exceed 0.8, then the feedrate of the table 16 is reduced. However, the feed drive has a minimum feedrate provided through the lead 173.

Furthermore, the override or gap eliminator network causes the table 16 to be fed at a maximum rate four times the maximum feedrate of the table 16 when the cutting tool 12 is cutting the workpiece 14. As shown in FIG. 8, the gap eliminator circuit receives signals, which are dependent upon the deflection of the cutting tool 12, the torque of the cutting tool 12, and the axial thrust of the cutting tool 12. Whenever a signal of a very small magnitude exists from any of These, the gap eliminator circuit is no longer effective to cause the table 16 to fed at a rate of four times the maximum feedrate when the cutting tool 12 is engaging the workpiece 14. It should be understood that this increased feedrate could be less or more than four times the maximum feedrate of the cutting tool 12 depending on operating conditions.

In addition, when the machine is in a milling or boring operation, signals from the torque sensor unit 32 and the deflection sensor units 131 and 132 are utilized to provide a signal to indicate the end of the life of the tool 12. The differential amplifier 241 compares the magnitudes of its two inputs. When these inputs become equal, a signal is supplied to actuate the microswitch 247 whereby the table 16 may retract the workpiece 14 from engagement with the cutting tool 12 or a warning light may be energized.

MACHINE USED FOR DRILLING, SPOT FACING, AND COUNTERBORING

When the machine is to be used for drilling, spot facing, or counterboring, it is necessary to position the operational selector dial 104 for these operations. As a result, the switch 106 is moved from contact with the lead 105 to engagement with a lead 250 (see FIG. 7C), the switch 109 is moved from engagement with the potentiometer 108 to engagement with a lead 251, the switch 243 is moved from engagement with the lead 242 to a grounded lead 252, and the switch 245 is moved from engagement with the lead 244 to a lead 253.

It also is necessary to position the base tool life selector dial 90 to vary the input of $(T^*)^{b/a}$. The fixed cost selector dial 89 also must be positioned for this particular operation to vary the input of $(t_c+60B/C)^{b/a}$. It should be understood that both the fixed cost selector dial 89 and the base tool life selector dial 90 would be positioned differently for each of the drilling, counterboring, and spot facing operations. The inputs of $(T^*)^{b/a}$ and $(t_c+60B/C)^{b/a}$ to the circuit 70 would not be the same for each of these operations.

It also is necessary to position the exponent selector dial 93 (see FIG. 7E) in accordance with the operation. The exponent $a$ is 0.5 for drilling, spot facing, and counterboring.

It also may be necessary to change the gear range of the gear train 23 (see FIG. 7A). This would be needed to insure that $V_{max}$ is at least $2V^*$.

It also is necessary to position the base speed selector dial 84 (see FIG. 7E) to provide a different input to the transdiode 78 since $V^*$ and $V_{max}$ have both changed. With the maximum cutting speed, $V_{max}$, shown on the cutting speed meter 102 (see FIG. 7A), the base speed selector dial 84 is turned until the desired $V^*$ appears on the base cutting speed meter 85.

For drilling, spot facing, and counterboring, the ratio of $X^*/X$ is generated as $$\frac{\left(\frac{n}{8}\frac{D}{D_{max}}\right)^{100}}{\left(\frac{n^*}{8}\frac{D^*}{D_{max}}\cdot\frac{F}{F^*}\right)^{100}}$$

In this ratio, $n$ is the number of flutes of the cutting tool 12, $D$ is the diameter of the cutting tool 12, and $F$ is the axial thrust on the cutting tool 12. The cut speed $V^*$ was obtained when machining a workpiece of the same material as the workpiece 14 with a cutting tool of the same material and type as the cutting tool 12. $n^*$ represents the number of flutes on the cutting tool in the previous test, $D^*$ is the diameter of the cutting tool in the previous test, and $F^*$ is the axial thrust force in the prior test. This test also produced $T^*$, which is the tool life of the cutting tool in minutes.

The numerator of the ratio of $X^*/X$ is supplied through the lead 250 (see FIG. 7C), the switch 106, and the lead 90' as an input to the transdiode 79. The denominator of the ratio of $X^*/X$ is supplied through the lead 251, the switch 109, and the lead 89' as an input to the transdiode 80.

The signal to the lead 250 originates at a positive DC voltage source 254, which is supplied as an input to an operational amplifier 255; the amplifier 255 is a DC amplifier. The input to the amplifier 255 from the source 254 is scaled by a potentiometer 256, which has its arm positioned by the diameter selector dial 100. The potentiometer 256 scales the 10 volt output of the source 254 by $D/D_{max}$. The maximum resistance of the potentiometer 256 is 10 times the resistance of a resistor 254', which is between the source 254 and the amplifier 255.

The output of the operational amplifier 255 is supplied to the lead 250 through a potentiometer 257. The potentiometer 257 has its arm positioned by a flute number selector dial 258. The potentiometer 257 scales the output of the operational amplifier 255 by $n/8$. Thus, the signal supplied to the transdiode 79 from the lead 250 is $$100\left(\frac{n}{8}\frac{D}{D_{max}}\right) \text{ volts}$$

Accordingly, the input to the transdiode 79 does not contain any variable parameter when the machine is used for drilling, spot facing, or counterboring. Thus, once the number of flutes on the cutting tool 12 and the diameter of the cutting tool 12 are selected, the input signal from the lead 250 to the transdiode 79 remains fixed throughout the cutting operation.

When the machine is used for drilling, spot facing, or counterboring, a switch 259 is positioned to connect the lead 220 to an operational amplifier 260, which is a DC amplifier, to provide an input thereto. The output of the demodulator 219 is $-10F/F_{max}$ volts and is supplied through the lead 220 and the switch 259 as an input to the operational amplifier 260. The output is scaled by $F_{max}/F^*$ through positioning the arm of a potentiometer 261 by a base axial thrust force selector dial 262. The output of the demodulator 219 is further scaled by $D^*/D_{max}$ through positioning the arm of a potentiometer 263 by a base diameter selector dial 264.

The output of the operational amplifier 260 is the negative of its input. Thus, the output of the amplifier 260 is positive since its input was negative due to the output of the demodulator 219 being negative.

A peak hold circuit, which comprises a diode 265 and a grounded capacitor 266, transmits the peak of the output from the amplifier 260 to a potentiometer 267. The output is scaled by $n^*/8$ through positioning the arm of the potentiometer 267 by a base flute number selector dial 268. The signal from the potentiometer 267 is supplied to the lead 251 from which it is supplied as part of the input to the transdiode 80 through the switch 109. Thus, the signal to the transdiode 80 from the lead 251 is the denominator of $X^*/X$ and is variable throughout the cutting operation. This is because the axial thrust varies during drilling, spot facing, or counterboring, and the demodulator 219 provides a signal proportional to this axial thrust.

Accordingly, the output from the circuit 70 to the static frequency converter 83 is logarithmically inversely proportional to the axial thrust on the cutting tool 12. Thus, as the axial thrust on the cutting tool 12 increases, the output from the circuit 70 decreases to reduce the speed of rotation of the spindle 11 and the cutting tool 12. In drilling, counterboring, or spot facing, it is desirable to reduce the speed of rotation of the cutting tool 12 when the axial thrust on the cutting tool 12 increases.

Furthermore, a decrease in the speed of rotation of the cutting tool 12 also results in the feedrate of the table 16 being reduced. As previously mentioned with respect to the milling and boring operations, the tachometer generator 97 (see FIG. 7A) provides a signal, which is directly proportional to the speed of rotation of the cutting tool 12, through the lead 103 to the differential amplifier 160 (see FIG. 7D). The output of the differential amplifier 160 controls the feedrate of the table 16 as previously described.

In drilling, spot facing, and counterboring operations, the constraints, which are utilized to reduce the feedrate when the constraint ratio exceeds the predetermined value of 0.8, are the torque ($M/M_{lim}$), the axial thrust ($F/F_{max}$), and the spindle motor current ($I/I_{max}$). There is no constraint for deflection in the drilling, spot facing, and counterboring operations because the switch 199' (see FIG. 7D) is moved to an open position and the switch 183 is in an open position.

The torque constraint selects the lesser of two torque limits. One of these is the torque required to twist the cutting tool 12 a given number of degrees to prevent chattering and cutting edge chipping while the other is the torque required to break the cutting tool 12. The twisting for a given number of degrees usually is a smaller torque than the torque required to break the drill. However, the smaller of these two torques is applied through the torque limit selector dial 201 (see FIG. 7C) by positioning the arm of the potentiometer 200 to scale the output of the demodulator 116 by $M_{max}/M_{lim}$.

The constraint ratios of $M/M_{lim}$, $F/F_{max}$, and $I/I_{max}$ are all supplied to the input of the differential amplifier 160 (see FIG. 7D) in the same manner as previously described for the milling and boring operations. Whenever any of these constraints exceeds the predetermined value of 0.8, the output of the differential amplifier 160 begins to drop in the same manner as previously described for the milling and boring operations. Likewise, the minimum feedrate of the table 16 is still maintained through the lead 173 and the potentiometer 175. Of course, the minimum feedrate may be changed in comparison with the minimum feedrate for milling and boring through positioning the minimum feedrate selector dial 177. Likewise, the maximum feedrate of the table 16 may be changed from that of the milling and boring operations through positioning the maximum feedrate selector dial 166. Of course, the dials 166 and 177 are changeable for any particular operation and may be changed during the operation if desired.

Furthermore, as mentioned for the milling and boring operations, the minimum feed detector 248 is utilized to produce a signal when the table 16 is being fed at its minimum feedrate. This may be utilized to produce a warning signal and/or retract the cutting tool 12 from the workpiece 14.

The override or gap eliminator network, which permits the table 16 to be fed at four times (This is with the potentiometer 162 set to transmit 25 percent or less of the voltage.) the maximum feedrate of the table 16 when the cutting tool 12 is cutting the material of the workpiece 14, is again utilized for drilling, spot facing, and counterboring operations. However, there is no input to the differential amplifier 228 from the lead 231 because the switch 231' is open. Thus, any accidental deflection of the cutting tool 12 in the type of operation being performed cannot be transmitted as an input to the amplifier 228. Therefore, the differential amplifier 228 causes the increased feedrate of the table 16 when there is no torque or axial thrust. Likewise, the increased feedrate of the table 16 is stopped when there is a signal to the differential amplifier 228 of −2 volts on the lead 232 or −0.2 volt on the lead 233.

The differential amplifier 241 (see FIG. 7C) is again utilized to energize the microswitch 247 when the end of the life of the cutting tool 12 has occurred. This is when the axial thrust force, $F$, on the cutting tool 12 becomes equal to the average tangential cutting force, $F_r$. This indicates that the cutting tool 12 has worn to a critical state of wear and/or work hardening of the material of the workpiece 14 is occurring.

The differential amplifier 241 supplies an output to energize the microswitch 247 whenever the signal on the lead 227 becomes equal to the signal on the lead 253. The potential on the lead 227 is $-10F/F_{max}$ volts from the output of the thrust demodulator 219 (see FIG. 7A), and the signal on the lead 253 is $40M/DF_{max}$ volts. Since $2M/D$ is equal to $F_r$, the signal on the lead 253 includes the tangential cutting force while the signal on the lead 227 contains the axial thrust force.

The signal on the lead 253 is originated at the output of a differential amplifier 270 (see FIG. 7C). The differential amplifier 270 receives the output of the demodulator 116 as an input. Thus, the output of the differential amplifier 270 is the negative of the input from the demodulator 116 so that its output is $-10M/M_{max}$ volts.

The output of the differential amplifier 270 is supplied by a lead 271 as an input to an input to an operational amplifier 272, which is a DC amplifier having its output connected to the lead 253. The output of the differential amplifier 270 is scaled by $D_{max}/D$ through positioning the arm of a potentiometer 273 by the diameter selector dial 100 and by $M_{max}/D_{max}F_{max}$ through positioning the arm of a potentiometer 274 by a trimmer dial 275. The output of the operational amplifier 272 also is increased by four since the maximum resistance of the potentiometer 274 is four times the maximum resistance of the potentiometer 273.

The output of the operational amplifier 272 is $40M/DF_{max}$ volts. This is supplied as an input to the differential amplifier 241 by the lead 253 through the switch 245. Of course, the lead 227 also is connected to the lead 253 so that it is also an input to the amplifier 241 through the switch 245. Thus, only the difference of the two signals actually is supplied to the amplifier 241. When this difference becomes zero due to the axial thrust force, $F$, increasing, the differential amplifier 241 provides an output through the lead 246 to actuate the microswitch 247.

As a result, the microswitch 247 can be utilized to energize a warning light and/or retract the cutting tool 12 from the workpiece 14 for changing of the cutting tool 12.

SUMMARY OF DRILLING, SPOT FACING, AND COUNTERBORING OPERATIONS

Considering the operation of the machine when the cutting operation is to be a drilling, spot facing, or counterboring operation, reference should be made to FIG. 9 wherein a block diagram shows the portions of the circuit of FIGS. 7A—7E utilized for drilling, spot facing, and counterboring operations. The circuit 70 produces an output, which is logarithmically inversely proportional to the varying axial thrust on the cutting tool 12. This signal is supplied from the axial thrust sensor unit 213.

The output of the circuit 70 is utilized to rotate the cutting tool 12 at the desired speed. As the signal from the circuit 70 increases, the speed of rotation of the cutting tool 12 increases. Likewise, as the signal from the circuit 70 decreases due to an increase in the signal from the axial thrust sensor 213, the speed of rotation of the cutting tool 12 is reduced.

Through the lead 103, the feed table 16 is driven at a speed proportional to the speed of rotation of the cutting tool 12. However, if any of the connected constraint ratios should exceed the predetermined value of 0.8, then the feedrate of the table 16 is no longer proportional to the speed of rotation of the cutting tool 12 but is reduced in accordance with the increasing constraint ratio.

Furthermore, a minimum feed of the table 16 is provided through the lead 173 and the potentiometer 175 so that the table 16 continues to be driven at a minimum feedrate even if the constraint ratio causes the output from the differential amplifier 160 to decrease below this minimum feedrate. This insures that the table 16 is driven at a minimum feedrate.

The gap eliminator network is responsive only to the torque and axial thrust when the machine is utilized for a drilling, spot facing, or counterboring operation. When there is no signal from the torque sensor unit 32 or the axial thrust sensor unit 213, the gap eliminator network causes the feedrate of the table 16 to be increased to four times (This is with the potentiometer 162 set to transmit 162 set to transmit 25 percent or less of the voltage.) the maximum feedrate of the table 16 when the cutting tool 12 is cutting the material of the workpiece 14.

The differential amplifier 241 actuates the microswitch 247 to provide a command signal to indicate the end of the life of the tool 12 when the two inputs to the differential amplifier 241 become equal. One of these inputs is directly proportional to the output of the torque sensor unit 32 and the other is directly proportional to the output of the axial thrust sensor unit 213.

MACHINE USED FOR TAPPING

When the machine is to be used for tapping, it is necessary to position the operational selector dial 104 (see FIG. 7C) for this operation. The operational selector dial 104 is positioned in the same position as for drilling, spot facing, and counterboring whereby the switch 106 engages the lead 250 and the switch 109 engages the lead 251. However, the positioning of the operational selector dial 104 for tapping positions the switches 243 and 245 in a neutral position so that there is no input to the differential amplifier 241.

Both the fixed cost selector dial 89 and the base tool life selector dial 90 must be disposed to provide the desired inputs of $(T^*)^{b/a}$ and $(t_c+60B/C)^{b/a}$ in accordance with the tapping operation. These inputs are supplied to the transdiodes 79 and 80 in the same manner as previously described.

It also is necessary to position the exponent selector dial 93 (see FIG. 7E) for tapping. For tapping, the exponent a is 0.5. The gear range of the gear train 23 (see FIG. 7A) also may have to be changed. This would be needed to insure that $V_{max}$ is at least $2V^*$. The base speed selector dial 84 (see FIG. 7E) must be positioned to provide a different input to the transdiode 78 since $V^*$ and $V_{max}$ have both changed. With $V_{max}$ on the meter 102 (see FIG. 7A) showing the cutting speed due to the spindle 11 rotating at its maximum speed for the gear range of the gear train 23, the base speed selector dial 84 is positioned so that the desired $V^*$ appears on the meter 85.

For tapping, the ratio of $X^*/X$ is generated as $$\frac{\left(\dfrac{n}{8}\dfrac{D}{D_{max.}}\right)10}{\left(\dfrac{n^*}{8}\dfrac{D^*}{D_{max.}}\right)\dfrac{M10}{M^*}}$$

In this ratio, $n$ is the number of flutes of the cutting tool 12, $D$ is the diameter of the cutting tool 12, and $M$ is the torque on the cutting tool 12. The base cutting speed, $V^*$, was obtained when machining a workpiece of the same material as the material of the workpiece 14 with a cutting tool of the same material and type as the cutting tool 12. The number of flutes on the cutting tool in the test in which $V^*$ was obtained is represented by $n^*$ with $D^*$ being the diameter of the cutting tool in the prior test and $M^*$ being the torque in the prior test. This test also produced $T^*$, which is the tool life of the cutting tool in minutes. $D_{max}$ has been previously defined.

The numerator of the ratio of $X^*/X$ is supplied through the lead 250 and the switch 106 as an input to the transdiode 79 in the same manner as previously described for the drilling, spot facing, and counterboring operations. This input is exactly the same since the numerator of $X^*/X$ is the same as for drilling, spot facing, and counterboring.

Thus, as previously mentioned with respect to the drilling, spot facing, and counterboring operations, the input of the transdiode 79 does not contain any variable parameter when the machine is used for tapping. Thus, once the number of flutes on the cutting tool 12 and the diameter of the cutting tool 12 are selected, the input signal from the lead 250 to the transdiode 79 remains fixed throughout the tapping operation.

When the machine is used for tapping, the switch 259 (see FIG. 7C) is positioned to connect the output of the differential amplifier 270 through the lead 271 and a lead 276.

As previously mentioned in describing the drilling, spot facing, and counterboring operations of the machine, the output of the differential amplifier 270 is $-10M/M_{max}$ volts. This output of the differential amplifier 270 is scaled by $M_{max}/M^*$ through positioning the arm of a potentiometer 277 in the lead 276. The position of the arm of the potentiometer 277 is set by a base torque selector dial 278. The input to the operational amplifier 260 is further scaled by appropriately positioning the arm of the potentiometer 263 through the base diameter selector dial 264 to scale the input by $D^*/D_{max}$.

As previously mentioned, the output of the operational amplifier 260 is the negative of its input. Thus, the output of the amplifier 260 is positive since its input was negative due to the output of the differential amplifier 270 being negative.

The peak hold circuit of the diode 265 and the grounded capacitor 266 transmits the peak of the output from the amplifier 260 to the potentiometer 267. As previously mentioned, the output of the amplifier 260 is scaled by $n^*/8$ through positioning the arm of the potentiometer 267 by the base flute number selector dial 268.

Thus, the signal from the potentiometer 267 is $$10\left(\frac{n^*}{8}\frac{D^*}{D_{max.}}\right)\frac{M}{M^*}\text{ volts}$$

This is the denominator of $X^*/X$. Accordingly, the signal to the transdiode 80 from the lead 251 is the denominator of $X^*/X$ and is variable throughout the tapping operation. This is because the torque on the cutting tool 12 varies during tapping so that the demodulator 116, which has its output supplied as an input to the differential amplifier 270, provides a signal proportional to the torque.

Accordingly, the output from the circuit 70 to the static frequency converter 83 (see FIG. 7A) is logarithmically inversely proportional to the torque on the cutting tool 12. Thus, as the torque on the cutting tool 12 increases, the output from the circuit 70 decreases to reduce the speed of rotation of the spindle 11 and the cutting tool 12. In tapping, it is desirable to reduce the speed of rotation of the cutting tool 12 when the torque on the cutting tool 12 increases.

Furthermore, a decrease in the speed of rotation of the cutting tool 12 also results in the feedrate of the table 16 being reduced. As previously described, the output of the differential amplifier 160 (see FIG 7D) controls the feedrate of the table 16 in direct proportion to the speed of rotation of the cutting tool 12. This signal is supplied to the differential amplifier 160 from the tachometer generator 97 (see FIG. 7A) by the lead 103.

In tapping, the feedrate of the table 16 for each revolution of the cutting tool 12 must remain fixed. This feedrate is set by the maximum feedrate selector dial 166.

Thus, the only way to prevent overloading of the cutting tool 12 and/or the machine when a torque limit or motor current constraint is exceeded while tapping is by reversing the direction of feed of the table 16 and the direction of rotation of the cutting tool 12. Accordingly, in a tapping operation, a switch 279 (see FIG. 7D) is positioned to mechanically connect the relay 249 to the spindle motor 22 (see FIG. 7A). The mechanical connection between the relay 249 and the motor 22 is indicated by dashed line 281.

The switch 279 also is mechanically connected to the switches 171 and 208 to connect the diode 169 and the diode 207, respectively, to the relay 249. Accordingly, when either the diode 169 or the diode 207 conducts because the constraint ratio of $M/M_l$ or $I/I_{max}$ exceeds 0.8, as previously described, the relay 249 is picked.

As a result, the direction of rotation of the spindle motor 22 is reversed through the mechanical connection 281 between the relay 249 and the motor 22. Likewise, the feed motor 19 (see FIG. 7A) for the table 16 has its direction of rotation reversed due to the mechanical connection, which is shown by the dashed line 249', between the relay 249 and the motor 19.

It should be understood that $M_{lim}$ in the constraint ratio of $M/M_{lim}$ is the smaller of the torque required to break the cutting tool 12 and the torque indicating a worn cutting tool. $M_{lim}$ is set by the torque limit selector dial 201 (see FIG. 7C).

Since high tapping torques are due to chips clogging in the flutes in many cases, the motor reversing relay 249 includes a time delay reset that switches the direction of rotation of the spindle motor 22 and the feed motor 19 again to the forward direction after a predetermined time period. This time delay reset permits a fixed set time for the spindle motor 22 and the feed motor 19 to operate in a reverse direction; this is normally sufficient for adequate clearance of any chips from the flutes of the cutting tool 12.

This cycling of the motor 22 and the motor 19 in forward and reverse directions continues until the cutting tool 12, which is a tap, reaches the desired depth to which the workpiece 14 is to be tapped. At this time, limit switches, which have been preset to the desired depth of the tap, on the machine cause complete retraction of the cutting tool 12. This retraction of the cutting tool 12 through reverse rotation of the motor 19 is performed in the well-known manner for tapping machines.

It should be understood that there is no input to the differential amplifier 160 due to either axial thrust on the cutting tool 12 or deflection of the cutting tool 12. This is accomplished by opening the switches 199' and 221'. The switch 221' is mechanically connected to the switch 279 for actuation therewith.

The differential amplifier 228 of the gap eliminator network is effective during tapping. However, only the signals from the leads 232 and 233 supply inputs to the differential amplifier 228 since the switch 231' is opened. Thus, in the same manner as described for drilling, spot facing, and counterboring, the feedrate of the table 16 is increased to four times (This is with the potentiometer 162 set to transmit 25 percent or less of the voltage.) its maximum feedrate during tapping when there is no engagement of the cutting tool 12 with the workpiece 14.

While the differential amplifier 241 and the microswitch 247 are not utilized to provide a command signal indicating the end of the life of the cutting tool 12 during tapping, the cutting tool 12 will not progress into the workpiece 14 regardless of the constraint action taken when $M/M_{lim}$ equals one. This is because the rubbing between the cutting edge of the tool 12 and the workpiece 14, which is caused by high tool wear, is causing most of the cutting torque.

When this happens, a manual retract command 283 transmits a signal to the relay 249 to reverse the direction of rotation of the spindle motor 22 and the feed motor 19 whereby the cutting tool 12 is retracted from the workpiece 14 for tool changing.

Summary of TAPPING OPERATION

Considering the operation of the machine when the machine is to perform a tapping operation, reference should be made to FIG. 10 wherein a block diagram shows the portions of the circuit of FIGS. 7A—7E utilized for tapping. The circuit 70 produces an output, which is logarithmically inversely proportional to the torque on the cutting tool 12. This signal is supplied to the circuit 70 from the spindle torque sensor unit 32.

The output of the circuit 70 is utilized to rotate the cutting tool 12 at the desired speed. As the signal from the circuit 70 increases, the speed of rotation of the cutting tool 12 increases. Likewise, as the signal from the circuit 70 decreases due to an increase in the signal from the spindle torque sensor unit 32, the speed of rotation of the cutting tool 12 is reduced.

Through the lead 103, the feed table 16 is driven at a speed proportional to the speed of rotation of the cutting tool 12. However, if either of the constraint ratios of the torque or the motor current should exceed the predetermined value of 0.8, then the relay 249 is energized to cause reversal of rotation of the spindle motor 22 and the feed motor 19. After a predetermined period of time, the relay 249 is deenergized, and the motor 22 and the feed motor 19 are again driven in the forward direction.

The gap eliminator network is responsive only to the torque and axial thrust when the machine is utilized for tapping. When there is no signal from the torque sensor unit 32 or the axial thrust sensor unit 213, the gap eliminator network causes the feedrate of the table 16 to be increased to four times (This is with the potentiometer 162 set to transmit 25 percent or less of the voltage.) the maximum feedrate of the table 16 when the cutting tool 12 is cutting the material of the workpiece 14.

When the cutting tool 12 will not progress into the workpiece 14 regardless of the constraint action taken, it is time to replace the cutting tool 12. Accordingly, the manual retract command 283 supplies a signal to the relay 249 to cause reversal of the spindle motor 22 and the feed motor 19 so that the cutting tool 12 may be withdrawn from the workpiece 14 for replacing the cutting tool 12.

It should be understood that the input to the relay 249 may be programmed into a numerical control apparatus for automatic control rather than being manually controlled through the command 283. Thus, when utilizing the control mechanism of the present invention with a numerical control apparatus, the numerical control apparatus would transmit a signal to the relay 249 after a predetermined number of reverse movements of the table 16 in a predetermined period of time.

MACHINE USED FOR REAMING

When the machine is to be used for reaming, the operational selector dial 104 (see FIG. 7C) and the exponent selector dial 93 (see FIG. 7E) are disposed in the same position as for tapping. Thus, the switch 106 engages the lead 250, and the switch 109 engages the lead 251. The switches 243 and 245 remain in the neutral position.

Both the fixed cost selector dial 89 and the base tool life selector dial 90 must be disposed to provide the desired inputs of $(T^*)^{b/a}$ and $(t_c+60B/C)^{b/a}$ in accordance with the reaming operation. These inputs are supplied to the transdiodes 79 and 80 in the same manner as previously described.

The gear range of the gear train 23 also may have to be changed from the range used in any of the other operations. This would be to insure that $V_{max}$ is at least $2\ V^*$. The base speed selector dial 84 (see FIG. 7E) must be positioned to provide a different input to the transdiode 78 since $V^*$ and $V_{max}$ will be different than for other operations. With the meter 102 (see FIG. 7A) showing the maximum cutting speed, $V_{max}$, when the spindle 11 is operating at its maximum speed for the selected gear range of the gear train 23, the base speed selector dial 84 is turned until the desired $V^*$ appears on the meter 85.

For reaming, the ratio of $X^*/X$ is the same as for tapping. However, the various values in this ratio will be changed in accordance with the reaming operation. That is, a different test would be utilized for reaming than for tapping so that $V^*$, $n^*$, $D^*$, $M^*$, and $T^*$ would be different than for tapping.

The inputs to the transdiodes 79 and 80 are supplied in the same manner as previously described for the tapping operation. Of course, the various selector dials would be positioned in accordance with the particular reaming operation.

Thus, as in tapping, the output from the circuit 70 to the static frequency converter 83 is logarithmically inversely proportional to the torque on the cutting tool 12. An increase in the torque on the cutting tool 12 results in a decrease in the output from the circuit 70 to reduce the speed of rotation of the spindle 11 and the cutting tool 12. Likewise, a decrease in the torque on the cutting tool 12 results in an increase in the rotating speed of the cutting tool 12 since the output from the circuit 70 increases.

As previously described, the output of the differential amplifier 160 controls the feedrate to the table 16 in direct proportion to the speed of rotation of the cutting tool 12. Of course, the output of the differential amplifier 160 may be reduced by the various constraint ratio outputs or overridden by the gap eliminator network.

In reaming, the constraints, which are utilized to reduce the feedrate when the ratio exceeds the predetermined value of 0.8 for the particular constraint, are the torque $M/M_{lim}$, the axial thrust $F/F_{max}$, and the spindle motor current $I/I_{max}$. There is no constraint signal for deflection since this parameter is not important in reaming. Accordingly, the switches 199' and 183 are open.

Since these constraints are the same as for the drilling, spot facing, and counterboring operations and these have been previously described, these inputs to the differential amplifier 160 will not be described further. It should be understood that $M_{lim}$ is the lesser of the torque to break the cutting tool 12 or the torque indicating a worn cutting tool. The smaller of these two torques is applied through the torque limit selector dial 201 (see FIG. 7C).

The differential amplifier 228 (see FIG. 7D) of the gap eliminator network is effective during reaming. Only the signals from the leads 232 and 233 supply inputs to the differential amplifier 228 in the same manner as described for drilling, spot facing, counterboring, and tapping since the switch 231' is open. Thus, the feedrate of the table 16 is increased to four times (This is with the potentiometer 162 set to transmit 25 percent or less of the voltage.) its maximum feedrate during reaming when there is no engagement of the cutting tool 12 with the workpiece 14.

While the differential amplifier 241 and the microswitch 247 are not utilized to provide a command signal indicating the end of the life of the cutting tool 12 during reaming, the cutting tool 12 will not progress into the workpiece 14 regardless of the constraint action taken when $M/M_{lim}$ equals one. This is because the rubbing between the cutting edge of the tool 12 and the workpiece 14, which is caused by high tool wear, is causing most of the cutting torque. In other words, feed has dropped to zero, but no reduction of reamer torque takes place because this torque is caused by rubbing of a worn tool which is unaffected by feed.

When this happens, the manual retract command 283 may be actuated to transmit a signal to the relay 249 to reverse the direction of rotation of the feed motor 19. It should be noted that the relay 249 remains mechanically connected to the motor 19 even when the tapping mode switch 279 is returned to its normal mode of operation. As a result of the feed motor 19 having its direction of rotation reversed, the cutting tool 12 is retracted from the workpiece 14 for tool changing.

Furthermore, the minimum feed detector 248 may be utilized to reverse the motor 19. This is because the signal from the detector 248 provides a signal to indicate that the feedrate of the table 16 is at the predetermined minimum. This signal may be utilized to pick the relay 249 whereby the feed motor 19 has its direction reversed to cause retraction of the cutting tool 12 from the workpiece 14 for tool changing.

SUMMARY OF REAMING OPERATION

Considering the operation of the machine when the machine is to perform a reaming operation, reference should be made to FIG. 11 wherein a block diagram shows the portions of the circuit of FIGS. 7A—7E utilized for reaming. The circuit 70 produces an output, which is logarithmically inversely proportional to the torque on the cutting tool 12. This signal is supplied to the circuit 70 from the spindle torque sensor unit 32.

The output of the circuit 70 is utilized to rotate the cutting tool 12 at the desired speed. Thus, an increase in the torque causes a decrease in the output of the circuit 70 whereby the speed of the cutting tool 12 is reduced. Likewise, a decrease in the output from the torque sensor unit 32 produces an increase in the signal from the circuit 70 whereby the speed of rotation of the cutting tool 12 is increased.

Through the lead 103 and the differential amplifier 160, the feed table 16 is driven at a speed proportional to the speed of rotation of the cutting tool 12. However, if any of the constraint ratios of the torque, the axial thrust, or the motor current exceeds the predetermined value of 0.8, then the feedrate of the table 16 is no longer proportional to the speed of rotation of the cutting tool 12 but is reduced in accordance with any signal created by any of the increasing constraint ratios.

Furthermore, the minimum feed of the table 16 is provided through the lead 173 and the potentiometer 175 so that the table 16 continues to be driven at a minimum feedrate even if the constraint ratio causes the output from the differential amplifier 160 to decrease beneath the minimum feedrate. This insures that the table 16 is driven at a minimum feedrate.

The gap eliminator network is responsive only to the torque and axial thrust when the machine is utilized for reaming. When there is no signal from the torque sensor unit 32 or the axial thrust sensor unit 213, the gap eliminator network causes the feedrate of the table 16 to be increased to four times (This is with the potentiometer 162 set to transmit 25 percent or less of the voltage.) the maximum feedrate of the table 16 when the cutting tool 12, which is a reamer, is cutting the material of the workpiece 14.

When the cutting tool 12 will not progress into the work regardless of the constraint action taken, it is time to replace the cutting tool 12. Accordingly, either the manual retract command 283 or the minimum feed detector 248 is utilized to pick the relay 249 whereby the feed motor 19 has its direction of rotation reversed so that the cutting tool 12 may be withdrawn from the workpiece 14 for replacement of the cutting tool 12.

It should be understood that the input to the relay 249 may be programmed into a numerical control apparatus for automatic control rather than being manually controlled through the command 283 or the minimum feed detector 248. Thus, when utilizing the control mechanism of the present invention with a numerical control apparatus, the numerical control apparatus would transmit a signal to the relay 249 after a predetermined number of reverse movements of the table 16 in a predetermined period of time.

While the present invention has been described using an analogue computer, it should be understood that the present invention could be utilized with a general or special purpose digital computer. In such an arrangement, an analogue to digital converter would be utilized in the leads 116', 138, 150, 170, and 220 to convert the output signals for use in the digital computer while a digital to analogue converter would be utilized in the leads 81 and 163 to convert the input signals to analogue signals. These types of converters are well known.

An advantage of this invention is that it permits maximum utilization of a cutting tool at a minimum cost. Another advantage of this invention is that it allows parts to be produced at a lower unit cost. A further advantage of this invention is that it simplifies programming of speeds and feeds for a cutting process. Still another advantage of this invention is that it prevents use of a tool beyond its productive life. A still further advantage of this invention is that it prevents breakage of the cutting tool and reduces part scrappage.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. In a machine tool having a workpiece supported thereon, a cutting tool therein extending toward the workpiece, and means to move the cutting tool and the workpiece relative to each other to advance the cutting tool and the workpiece relative toward each other, a mechanism for controlling the relative moving means comprising:

first means to produce a first signal in accordance with the cutting force between the cutting tool and the workpiece;

second means to produce a second signal in accordance with the axial thrust of the cutting tool;

means to regulate the feedrate of the relative moving means;

said regulating means including first means to produce a signal in accordance with the cutting conditions to regulate the feedrate of the relative moving means, said first means of said regulating means receiving a signal from said first producing means as an input signal varying in accordance with the cutting conditions during certain cutting operations and a signal from said second producing means as an input signal varying in accordance with the cutting conditions during other cutting operation; and said regulating means including second means responsive to the absence of a signal from both said first producing means and said second producing means to increase the feedrate to a predetermined feedrate of said relative moving means irrespective of the signal from said first means of said regulating means.

2. The control mechanism according to claim 1 including third means to produce a third signal in accordance with the resultant deflection of the cutting tool; said second responsive means being activated only when there is the absence of a signal from said third means in addition to the absence of a signal from both said first producing means and said second producing means; and means to render said third means active only when the cutting tool is performing a milling or boring operation.

3. In a machine tool having a workpiece supported thereon, a cutting tool therein extending toward the workpiece and one of the cutting tool and the workpiece being rotatable relative to the other, means to rotate the rotatable one of the cutting tool and the workpiece, and means to move the cutting tool and the workpiece relative to each other, a mechanism for controlling the rates of operation of the rotating means and the movable means comprising:

first means to produce a first signal proportional to the cutting force between the cutting tool and the workpiece;

second means to produce a second signal proportional to the resultant deflection of the cutting tool;

third means to produce a third signal proportional to the axial thrust of the cutting tool;

means to receive an input from at least one of said first means, said second means, and said third means;

said receiving means producing an output logarithmically related to its input;

fourth means to regulate the speed of the rotating means in accordance with the output of said receiving means; and fifth means to regulate the relative moving means, said fifth means being responsive to the output of said receiving means.

4. The control mechanism according to claim 3 including:

means to connect the second signal from said second means as an input to said receiving means that is inversely logarithmically proportional to the output of said receiving means only when the tool is performing a milling or boring operation;

means to connect the third signal from said third means as an input to said receiving means that is inversely logarithmically proportional to the output of said receiving means only when the tool is performing a drilling, spot facing, or counterboring operation; and means to connect the first signal from said first means as an input to said receiving means that is inversely logarithmically proportional to the output of said receiving means only when the tool is performing a tapping or reaming operation and to connect the first signal from said first means as an input to said receiving means that is directly logarithmically proportional to the output of said receiving means only when the tool is performing a milling or boring operation.

5. The mechanism according to claim 3 including means to maintain the feedrate of the relative moving means at a predetermined minimum irrespective of the signal from said fifth means.

6. In a machine tool having a workpiece supported thereon, a cutting tool therein extending toward the workpiece, and means to move the cutting tool and the workpiece relative to each other, a device for determining the end of the life of the cutting tool comprising:

first means to produce a first signal in accordance with the cutting force between the cutting tool and the workpiece;

second means to produce a second signal in accordance with the axial thrust of the cutting tool; and means to produce a signal only when the first and second signals are equal to indicate the end of the life of the cutting tool.

7. In a machine tool having a workpiece supported thereon, a cutting tool therein extending toward the workpiece, and means to move the cutting tool and the workpiece relative to each other, a device for determining the end of the life of the cutting tool comprising:

first means to produce a first signal in accordance with the cutting force between the cutting tool and the workpiece;

second means to produce a second signal in accordance with the resultant deflection of the cutting tool;

and means to produce a signal only when the first and second signals are equal to indicate the end of the life of the cutting tool.

8. The device according to claim 6 including:

third means to produce a third signal in accordance with the resultant deflection of the cutting tool;

means to receive the first signal and one of the second and third signals, said receiving means including said end of tool life signal producing means; and means to connect the second signal from said second means to said receiving means only when the cutting tool is performing a drilling, spot facing, or counterboring operation and to connect the third signal from said third means to said receiving means only when the cutting tool is performing a milling or boring operation.

9. In a machine tool having a workpiece supported thereon, a cutting tool therein extending toward the workpiece, and means to move the cutting tool and the workpiece relative to each other, a mechanism for controlling the relative moving means comprising:

means to produce a first signal in accordance with the cutting conditions to regulate the feedrate of the relative moving means to produce relative advancement of the cutting tool and the workpiece toward each other;

means to produce a second signal to maintain the feedrate of the relative moving means at a predetermined minimum to produce continued relative advancement of the cutting tool and the workpiece toward each other; and means to render the second signal effective to control the feedrate of the relative moving means when the first signal produces a feedrate below the predetermined minimum so that continued and uninterrupted relative advancement of the cutting tool and the workpiece toward each other occurs.

10. The control mechanism according to claim 9 including means to produce a third signal to maintain the feedrate at a predetermined maximum when the cutting tool is not engaging the workpiece and means to render said producing means for the third signal inactive when the cutting tool engages the workpiece.

11. The control mechanism according to claim 9 including means to reverse the direction of feed of the relative moving means when a predetermined cutting condition exists.

12. In a machine tool having a workpiece supported thereon, a rotatable tap therein extending toward the workpiece, means to rotate the tap, and means to move the tap and the workpiece relative to each other, a mechanism for controlling the relative moving means comprising:
 means to regulate the speed of the rotating means in accordance with the cutting conditions;
 means to regulate the feedrate of the relative moving means in accordance with the speed of the rotating means; and
 means to simultaneously reverse the direction of rotation of the rotating means and the feed of the relative moving means to withdraw the tap from the workpiece by coordinating the reverse feed of the relative moving means with the reverse rotation of the rotating means when a predetermined cutting condition occurs.

13. The control mechanism according to claim 12 including means to maintain the feedrate of the relative moving means at a predetermined maximum irrespective of the speed of the rotating means when the tap is not engaging the workpiece.

14. The control mechanism according to claim 12 including means to deactivate said simultaneous reversing means after a predetermined period of time; and means to inactivate said deactivating means after a predetermined number of actuations of said simultaneous reversing means in a predetermined period of time.

15. The control mechanism according to claim 1 in which said regulating means includes third means responsive to one of a first signal from said first producing means exceeding a predetermined value and a second signal from said second producing means exceeding a predetermined value to decrease the feedrate of the relative moving means irrespective of the signal from said first means of said regulating means.

16. The control mechanism according to claim 15 including means to maintain a minimum feedrate of the relative moving means irrespective of the signal from said first means of said regulating means and the signal from said third means of said regulating means.

17. The control mechanism according to claim 1 in which said first means of said regulating means produces a signal logarithmically related to its input.

18. The control mechanism according to claim 1 including means to maintain a minimum feedrate of the relative moving means irrespective of the signal from said first means of said regulating means.

19. The control mechanism according to claim 2 including:
 fourth means to receive an input from each of said first and third producing means during a milling or boring operation;
 said fourth means comparing the signals from said first and third producing means and producing an output in accordance with the difference therebetween; and
 means to connect the output of said fourth means to said regulating means when the output from said fourth means exceeds a predetermined value with the signal to said fourth means from said first producing means being larger than the signal from said third producing means to reduce the feedrate as the output of said fourth means increases beyond the predetermined value whereby the finish of the surface of the workpiece is controlled.

20. The control mechanism according to claim 2 including:
 means to produce relative rotation between the cutting tool and the workpiece;
 said rotation producing means being responsive to the signal of said first means of said regulating means to control the relative speed of rotation;
 means to connect the first signal from said first producing means as an input to said first means of said regulating means when the tool is performing a tapping, reaming, milling or boring operation, the first signal varying in accordance with the cutting conditions;
 means to connect the second signal from said second producing means as an input to said first means of said regulating means only when the tool is performing a drilling, spot facing, or counterboring operation, the second signal varying in accordance with the cutting conditions; and
 means to connect the third signal from said third producing means as an input to said first means of said regulating means only when the tool is performing a milling or boring operation, the third signal varying in accordance with the cutting conditions.

21. The control mechanism according to claim 2 including:
 means for determining the end of the life of the cutting tool;
 said determining means including;
 means to receive the first signal from said first producing means and one of the second signal from said second producing means and the third signal from said third producing means, said receiving means producing a signal only when the received signals are equal to indicate the end of the life of the cutting tool; and
 means to connect the second signal from said second producing means to said receiving means only when the cutting tool is performing a drilling, spot facing, or counterboring operation and to connect the third signal from said third producing means to said receiving means only when the cutting tool is performing a milling or boring operation.

22. The control mechanism according to claim 3 including means to supply a signal to said fifth means to decrease the feedrate of said relatively moving means when a signal to said fifth means from any of said first means, said second means, and said third means exceeds a predetermined value.

23. The control mechanism according to claim 3 including:
 means for determining the end of the life of the cutting tool;
 said determining means including:
 means to receive the first signal from said first means and one of the second signal from said second means and the third signal from said third means, said receiving means producing a signal only when the received signals are equal to indicate the end of the life of the cutting tool; and
 means to connect the second signal from said second means to said receiving means only when the cutting tool is performing a drilling, spot facing, or counterboring operation and to connect the third signal from said third means to said receiving means only when the cutting tool is performing a milling or boring operation.

24. The control mechanism according to claim 3 including:
 sixth means to receive an input from each of said first and second means during a milling or boring operation;
 said sixth means comparing the signals from said first and second means and producing an output in accordance with the difference therebetween; and
 means to connect the output of said sixth means to said fifth means when the output from said sixth means exceeds a predetermined value with the signal to said sixth means from said first means being larger than the signal from said second means to reduce the feedrate as the output of said sixth means increases beyond the predetermined value irrespective of the output of said receiving means whereby the finish of the surface of the workpiece is controlled.

25. The control mechanism according to claim 4 including means to maintain the feedrate of the relative moving means at a predetermined minimum irrespective of the signal from said fifth means when the tool is performing a milling, boring, drilling, spot facing, or counterboring operation.

26. In a machine tool having a workpiece supported thereon, a cutting tool therein extending toward the workpiece and one of the cutting tool and the workpiece being rotatable relative to the other, and means to rotate the rotatable one of the cutting tool and the workpiece, a mechanism for controlling the rate of rotation of the rotating means comprising:

first means to produce a first signal proportional to the cutting force between the cutting tool and the workpiece;

second means to produce a second signal proportional to the resultant deflection of the cutting tool;

third means to produce a third signal proportional to the axial thrust of the cutting tool;

means to receive an input from at least one of said first means, said second means, and said third means;

said receiving means producing an output logarithmically related to its input; and fourth means to regulate the speed of the rotating means in accordance with the output of said receiving means.

27. In a machine tool having a workpiece supported thereon, a cutting tool therein extending toward the workpiece and one of the cutting tool and the workpiece being rotatable relative to the other, and means to move the cutting tool and the workpiece relative to each other, a mechanism controlling the relative moving means comprising:

means to control the feedrate of the relative moving means in response to the speed of rotation of the one of the cutting tool and the workpiece that is rotated;

means to render said control means ineffective when certain cutting conditions exist to reduce the feedrate of the relative moving means in accordance with the cutting conditions; and means to maintain a minimum feedrate of the relative moving means irrespective of the signal from said rendering means.

28. The control mechanism according to claim 27 including means to connect said maintaining means to receive a signal depending on the speed of rotation of the one of the cutting tool and the workpiece that is rotated to maintain the feedrate of the relative moving means at a predetermined minimum relative to the speed of rotation of the one of the cutting tool and the workpiece that is rotated.

29. In a machine tool having a workpiece supported thereon, a cutting tool therein extending toward the workpiece and one of the cutting tool and the workpiece being rotatable relative to the other, and means to move the cutting tool and the workpiece relative to each other to relatively advance the cutting tool and the workpiece toward each other, a mechanism for controlling the relative moving means to control the finish of a surface being cut during a milling or boring operation comprising:

first means to produce a first signal proportional to the cutting force between the cutting tool and the workpiece;

second means to produce a second signal proportional to the deflection of the cutting tool;

third means to receive signals from said first and second means, said third means comparing the signals from said first and second means and producing an output in accordance with the difference therebetween;

means to regulate the feedrate of the relative moving means; and said regulating means regulating means including means to receive a signal from said third means when the signal from said third means exceeds a predetermined value with the signal to said third means from said first means being larger, said regulating means reducing the feedrate as the signal from said third means increases beyond the predetermined value.